(12) United States Patent
Lazarou et al.

(10) Patent No.: US 11,755,120 B2
(45) Date of Patent: Sep. 12, 2023

(54) METHOD AND DEVICE FOR RECOGNIZING A GESTURE IN REAL-TIME

(71) Applicant: MANOMOTION AB, Stockholm (SE)

(72) Inventors: Michalis Lazarou, Nicosia (CY); Haibo Li, Täby (SE); Bo Li, Sundyberg (SE); Shahrouz Yousefi, Solna (SE)

(73) Assignee: MANOMOTION AB, Stockholm (SE)

( * ) Notice: Subject to any disclaimer, the term of this patent is extended or adjusted under 35 U.S.C. 154(b) by 161 days.

(21) Appl. No.: 17/440,498

(22) PCT Filed: Mar. 18, 2020

(86) PCT No.: PCT/SE2020/050282
§ 371 (c)(1),
(2) Date: Sep. 17, 2021

(87) PCT Pub. No.: WO2020/190200
PCT Pub. Date: Sep. 24, 2020

(65) Prior Publication Data
US 2022/0180663 A1 Jun. 9, 2022

(30) Foreign Application Priority Data

Mar. 20, 2019 (SE) .................................... 1950348-1

(51) Int. Cl.
*G06F 3/01* (2006.01)
*G06T 7/13* (2017.01)
(Continued)

(52) U.S. Cl.
CPC ................ *G06F 3/017* (2013.01); *G06T 7/13* (2017.01); *G06T 7/60* (2013.01); *G06V 10/443* (2022.01);
(Continued)

(58) Field of Classification Search
CPC .. G06F 3/017; G06T 7/13; G06T 7/60; G06V 10/443; G06V 10/46; G06V 10/50; G06V 40/113; G06V 40/20
See application file for complete search history.

(56) References Cited

U.S. PATENT DOCUMENTS 5,454,043 A * 9/1995 Freeman .............. G06V 10/421
345/473
6,788,809 B1 * 9/2004 Grzeszczuk ......... G06V 40/107
382/103
(Continued)

FOREIGN PATENT DOCUMENTS

| CN | 107329564 | * | 6/2017 |
| WO | WO 2014/021755 | * | 2/2014 |
| WO | 2015/102527 | | 7/2015 |

OTHER PUBLICATIONS

Zhang et al., "Histogram of 3O Facets: A depth descriptor for human action and hand gesture recognition", Computer Vision and Image Understanding 139 (2015) 29-39 (Year: 2015).*

Sharma, "Improved shape matching and retrieval using robust histograms of spatially distributed points and angular radial transform", Optik 145 (2017) 346-364 (Year: 2017).*

(Continued)

*Primary Examiner* — Qian Yang
(74) *Attorney, Agent, or Firm* — NIXON & VANDERHYE

(57) ABSTRACT

The present disclosure relates to a method and a device for recognizing hand gestures in real-time. A shape is given as an input in a form of a binary image. The shape contour is partitioned into radial and angular spaces by an Angular Radial Bin distribution including multiple concentric circles and angular space partitions in a way that multiple angular radial sections are created denoted Angular Radial Bins. The ARB distribution is angle tilted through its centre of mass multiple times and the same procedure is repeated in order to capture a shape descriptor from different angle perspectives. A shape descriptor is calculated for each of an angle (Continued)

tilted instance of the ARB distribution belonging to a sequence of angle tilted instances of the ARB distribution.

26 Claims, 18 Drawing Sheets

(51) Int. Cl.
- *G06V 40/20* (2022.01)
- *G06T 7/60* (2017.01)
- *G06V 10/44* (2022.01)
- *G06V 10/50* (2022.01)
- *G06V 10/46* (2022.01)
- *G06V 40/10* (2022.01)

(52) U.S. Cl.
CPC .............. *G06V 10/46* (2022.01); *G06V 10/50* (2022.01); *G06V 40/113* (2022.01); *G06V 40/20* (2022.01)

(56) References Cited

U.S. PATENT DOCUMENTS

| | | | | |
|---|---|---|---|---|
| 8,971,572 | B1* | 3/2015 | Yin | G06F 3/0304 345/173 |
| 2011/0234840 | A1 | 9/2011 | Klefenz et al. | |
| 2012/0070070 | A1 | 3/2012 | Litvak | |

OTHER PUBLICATIONS

Jurie et al., "Scale-invariant shape features for recognition of object categories", Proceedings of the 2004 IEEE Computer Society Conference on Computer Vision and Pattern Recognition (CVPR'04) (Year: 2004).*

Suni et al., "Fusing Multimodal features for Recognizing Hand Gestures", 2019 Second International Conference on Advanced Computational and Communication Paradigms (ICACCP) (Year: 2019).*

Machine translation for CN 107329564 (Year: 2017).*

International Search Report for PCT/SE2020/050282 dated May 11, 2020, 5 pages.

Written Opinion of the ISA for PCT/SE2020/050282 dated May 11, 2020, 5 pages.

Swedish Search Report for 1950348-1 dated Mar. 20, 2019, 3 pages.

Lazarou, "A novel shape matching descriptor for real-time hand gesture recognition", KTH Degree Project In Information and Communication Technology, Second Cycle, 30 Credits, Sweden 2018, 78 pages.

Ren et al., "Hand Gesture Recognition with Multiscale Weighted Histogram of Contour Direction Normalization for Wearable Applications", IEEE Transactions on Circuits and Systems for Video Technology, vol. 28, No. 2, Feb. 1, 2018, pp. 364-377.

Sheenu et al., "Histograms of orientation gradient investigation for static hand gestures" International Conference on Computing, Communication & Automation, May 15, 2015, 4 pages.

\* cited by examiner

METHOD AND DEVICE FOR RECOGNIZING A GESTURE IN REAL-TIME

This application is the U.S. national phase of International Application No. PCT/SE2020/050282 filed Mar. 18, 2020 which designated the U.S. and claims priority to Swedish Patent Application No. 1950348-1 filed Mar. 20, 2019, the entire contents of each of which are hereby incorporated by reference.

TECHNICAL FIELD

The following disclosure relates to the technical field of computer vision and more specifically to image descriptors.

BACKGROUND

One of the main problems in computer vision is the problem of object recognition such as recognizing that a ball is a ball or a hat is a hat. In order to differentiate between different objects and identify similarities between objects of the same type various different properties of the objects are taken into consideration.

Image descriptors are descriptors of the visual features of the contents of images. One of the most important attributes that an object has is its shape. Shape provides important information in order to differentiate between images containing different objects such as different types of hand gestures. Especially in black and white images, denoted binary images, that lack colour and texture information, shape can provide significant information to identify what type of hand gesture is represented. The image descriptor used for shape matching is denoted as shape descriptor. The purpose of shape matching is to identify from a database of shape descriptors the nearest neighbour of a query shape represented as a shape descriptor. The geometric properties of the shape in a binary image are captured through this image and can be used to compare the similarity between different shapes.

One shape descriptor that belongs in the family of computer vision is called Angular-Radial Bin (ARB) distribution. Its purpose is to be used when identifying the closest neighbouring shape in a database of shapes wherein all shapes are represented as shape descriptors for a query shape. The uniqueness of the ARB distribution shape descriptor is that it provides excellent accuracy results for highly articulated shapes such as hand gestures while being very time efficient. A shape is given as an input in a form of a binary image.

The following disclosure primarily concerns identification of the closest or equivalent binary image of a shape from a database of binary images of various different shapes and such a procedure is called shape matching.

In shape matching applications apart from identifying the most similar shape between different shapes there are certain properties that are required for a shape matching algorithm to be considered robust. A good shape matching algorithm should therefore involve the following properties:

Rotation Invariance: The accuracy of the algorithm should not be affected when the query shape is rotated.
Translation Invariance: The accuracy of the algorithm should not be affected when the query shape is found in a different position in the image.
Scale Invariance: the accuracy of the algorithm should not be affected when the query shape is presented as smaller or bigger than expected.
Invariance to deformation: The accuracy of the algorithm should not be affected by small regress of deformation.

Apart from the accuracy of the algorithm another important factor to consider is the time complexity of the shape matching algorithm. This means the time required to compare one shape to the other. The most accurate shape matching algorithms currently found in literature tend to require high computational resources with non-linear matching complexities. For example the widely used shape matching method shape context that has been used for hand gesture recognition has an average time matching complexity of $O(n3)$. Other shape matching methods with faster matching complexities are also available, such as Hu moments and Fourier descriptors. Fourier descriptors in particular have been used for hand gesture recognition application due to their linear matching complexity, $O(n)$, easy implementation and desired properties such as translation, scale and rotation invariance.

SUMMARY

The object of the following disclosure is to provide a method and a device for recognizing gestures in real-time being more accurate, robust and time effective than already known shape matching methods. This object and others are achieved by the method and the device according to the independent claims, and by the embodiments and examples according to the dependent claims.

In accordance with a first aspect, a method for recognizing a gesture in real-time is provided. The method is performed in a device having access to a database of histograms. Each histogram is a shape descriptor of a shape contour of a gesture image. Each shape descriptor and histogram contains weights of the contour pixels, wherein the weights are calculated by means of the contour pixels within Angular Radial Bins, ARBs. The device is configured to communicate with a sensor adapted to capture an image of a gesture. The method comprises the steps of determining a contour pixel image from the captured image of a query gesture, calculating an ARB distribution adapted to the contour pixels image of the gesture, determining a histogram by calculating a shape descriptor for each of an angle tilted instance (n) of the ARB distribution belonging to a sequence of angle tilted instances (n=0, 1, 2, . . . , N−1) of the ARB distribution, wherein the weight $h_n(i,j)$ of each $ARB(i,j)$ is based on the contour pixels within the $ARB(i,j)$, comparing the determined histogram of the captured gesture image to the histograms of the database, and determining a gesture by selecting the histogram of the database best matching the calculated histogram.

In accordance to a second aspect, a device for recognizing a gesture in real-time is provided. The device has access to a database of histograms. Each histogram is a shape descriptor of a shape contour of a gesture image. Each shape descriptor and histogram contains weights of the contour pixels, wherein the weights are calculated by means of the contour pixels within Angular Radial Bins, ARBs. The device is connectable to a sensor adapted to capture an image of a gesture. The device comprises a processing unit configured to determine a contour pixels image from the captured image of a query gesture, determine a histogram by calculating a shape descriptor for each of an angle tilted instance (n) of the ARB distribution belonging to a sequence of angle tilted instances (n=0, 1, 2, . . . , N−1) of the ARB distribution, wherein the weight $h_n(i,j)$ of each $ARB(i,j)$ is based on the contour pixels within the $ARB(i,j)$, compare the determined histogram of the captured gesture image to the histograms of the database, and determine a gesture by selecting the histogram of the database best matching the calculated histogram.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

Figure 1:
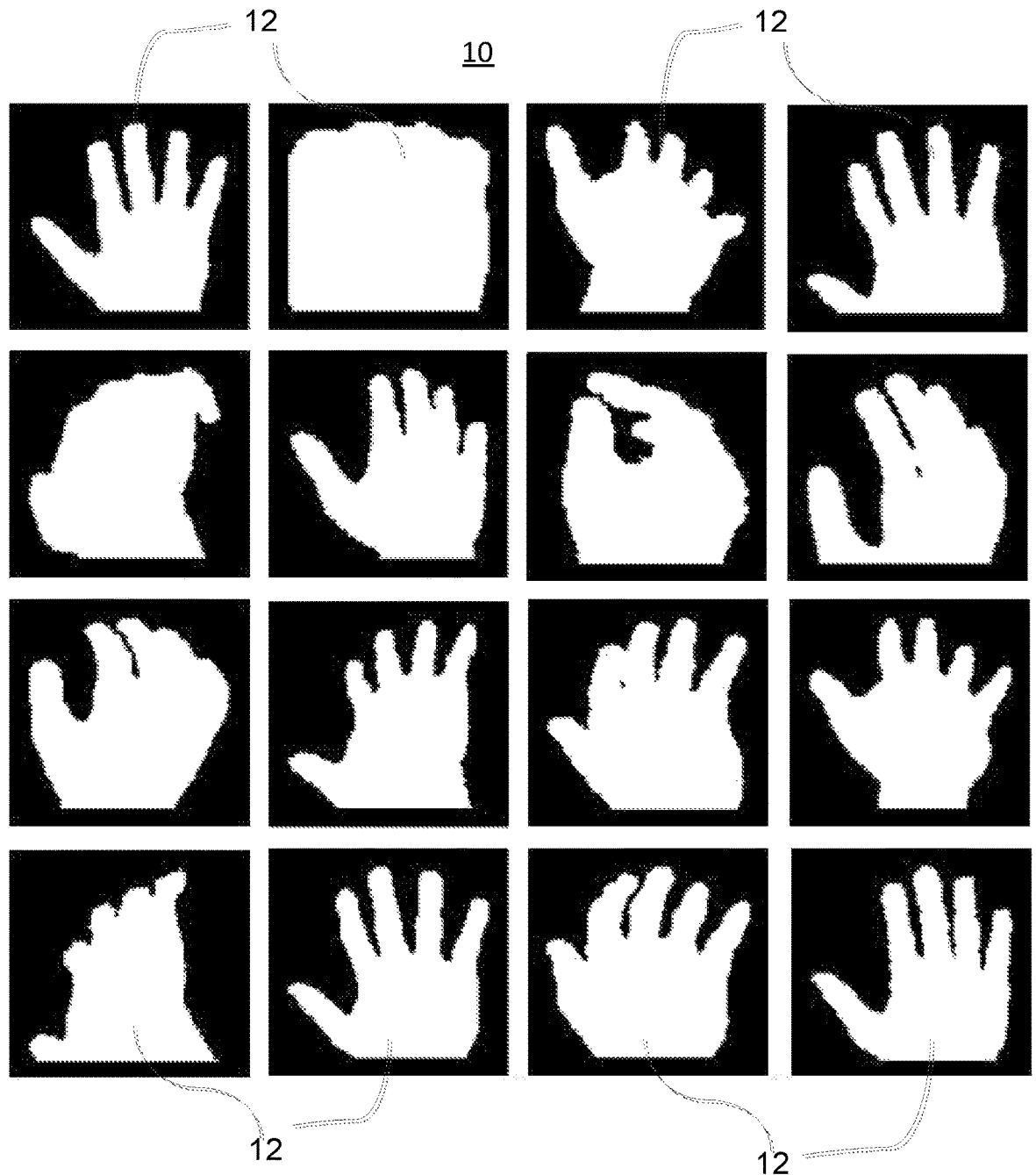
FIG. 1 is an example of the content of a database used for gesture recognition.

In the following description, for purposes of explanation and not limitation, specific details are set forth in order to provide a thorough understanding of the present technique. However, it will be apparent to one skilled in the art that the present technique may be practiced in other embodiments that depart from these specific details. In other instances, detailed descriptions of well-known methods, devices, and circuits are omitted so as not to obscure the description of the present technique with unnecessary detail.

The following disclosure relates to gesture recognition using Angular-Radial Bin (ARB) distribution. Shape descriptor is a description of the shape features of the contents in images, videos, or algorithms or applications that produce such descriptions.

ARB distribution is used as a shape descriptor and it is a histogram based shape descriptor. In that sense shape descriptor means the way that the shape is described, in our case we describe a shape using the ARB distribution therefore the ARB distribution is the shape descriptor. Each bin in a histogram is a bin of the shape descriptor. Its purpose is to be used when identifying the closest neighbouring shape in a database of shapes wherein all shapes are represented as shape descriptors of a query shape. The uniqueness of the ARB shape descriptor is that it provides excellent accuracy results for highly articulated shapes such as hand gestures while being very time efficient. A shape is given as an input in a form of a binary image. Using the 0th and 1st order raw moments of the image, the centre of mass of the shape is calculated. The pixels that represent the contours of the shape are identified using contours using Suzuki's algorithm. The shape contour is partitioned into radial and angular spaces by means of the Angular Radial Bin distribution comprising multiple concentric circles and angular space partitions in a way that multiple angular radial sections are created denoted Angular Radial Bins. The Euclidean distance of every contour pixel to the centre of mass of the shape is calculated and the total Euclidean distance of all the contour points to the centre of mass of the shape that are placed in the bin, represent the weight of that ARB. The ARB distribution is angle tilted through its centre of mass multiple times and the same procedure is repeated in order to capture a shape descriptor from different angle perspectives. A shape descriptor is calculated for each angle tilted instance of the ARB distribution belonging to a sequence of angle tilted instances of the ARB distribution.

The multiple shape descriptors are stored as a 3D-histogram (histogram in three dimensions) or accumulated in a 2D-histogram (histogram in two dimensions). An element of the histogram represents the weight of the shape descriptor in angular, radial and rotated bin. The similarity between two shapes is calculated using the Euclidean distance between the corresponding shape descriptors of each shape.

FIG. 1 is an example of the content of a database used for gesture recognition.

The database 10, sometimes denoted a gesture map, comprises a huge number of hand gestures 12 which is used for identifying a query gesture which is captured by a device. Each gesture is represented by a 2D-histogram and/or 3D-histogram, which is a descriptor of the hand gesture. The query gesture is represented by an image, query image, which is digitally processed by a digital processor to a binary image.

Figure 2:
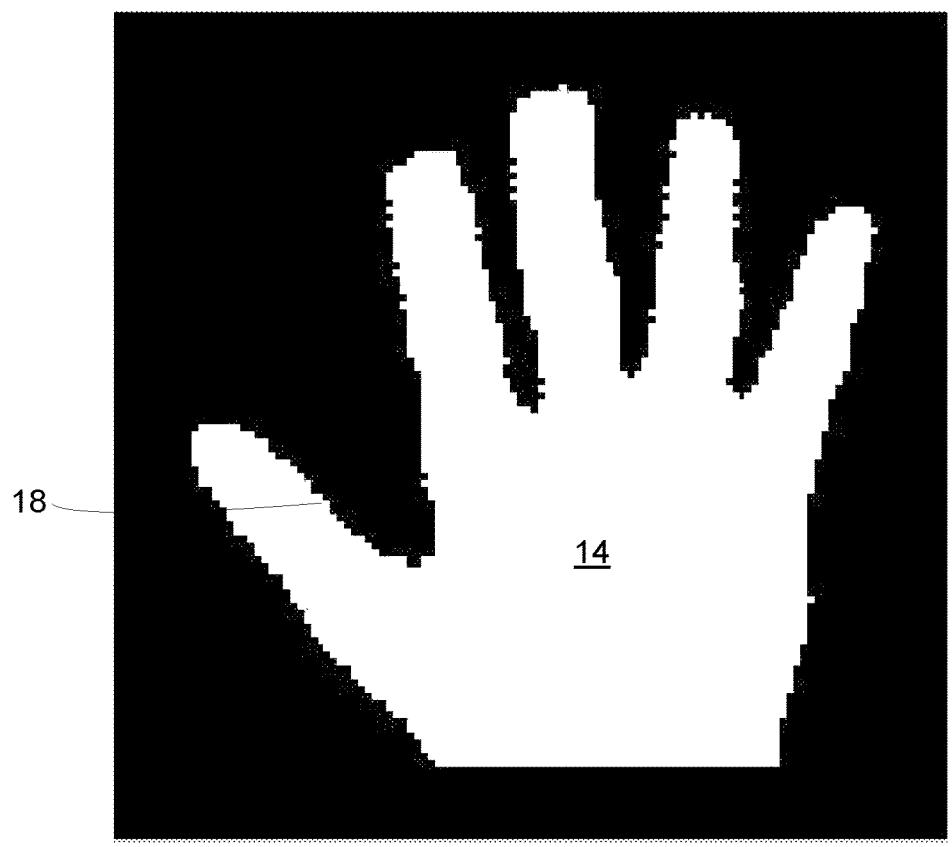
FIG. 2 is an illustration of a binary image of a hand gesture.

FIG. 2 is an illustration of a binary image of a hand gesture.

The binary image 14 is black and white. The white part is the gesture and the black part is the background. The shape contour is constituted by the pixels in the border between black and white. The contour pixels 18 can be identified by use of a suitable existing contour algorithm, e.g. the Suzuki algorithm. The calculation will result in a contour pixel image.

Figure 3:
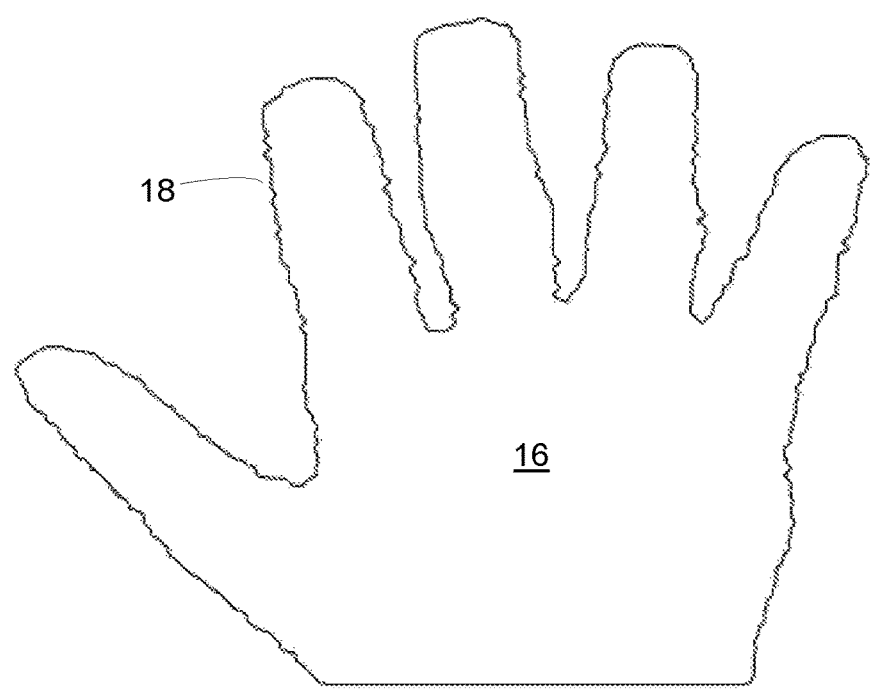
FIG. 3 is an illustration of a contour pixel image of a hand gesture.

FIG. 3 is an illustration of a contour pixel image of a hand gesture.

In this example, the contour pixels 18 of the contour pixel image 16 appeal as white pixels of the contour of the gesture. Typically, from a binary image with the size of 100×100 pixels, the contour calculation results in a shape contour comprising 300-600 contour pixels. Since the number of pixels that are used to represent the contour of the shape are directly proportional to size of the shape, it makes the shape descriptor scale variant. In order to make the shape descriptor scale invariant the total mass of the shape is used as a scaling factor.

The centre of mass and total mass of the shape are calculated. The centre of mass and total mass of the shape ate calculated by using the $0^{th}$ and $1^{st}$ order raw moments of the binary image. Image moments are defined as a weighted average of the pixels' intensities. The raw moments of an image, f, of dimension N×N in the (x, y)-plane are defined as:

$$M_{p,q} = \sum_{x=0}^{N-1}\sum_{y=0}^{N-1} x^p y^q f(x, y)$$

The total mass of the shape can be found by finding the $0^{th}$ order raw moment $M_{0,0}$ defined as:

$$M_{0,0} = \sum_{x=0}^{N-1}\sum_{y=0}^{N-1} x^0 y^0 f(x, y)$$

The centre of mass of the binary image is given by the $1^{st}$ order raw moment when normalized by the total mass:

$$\bar{x} = \frac{M_{1,0}}{M_{0,0}} \text{ and } \bar{y} = \frac{M_{0,1}}{M_{0,0}}$$

Figure 4:
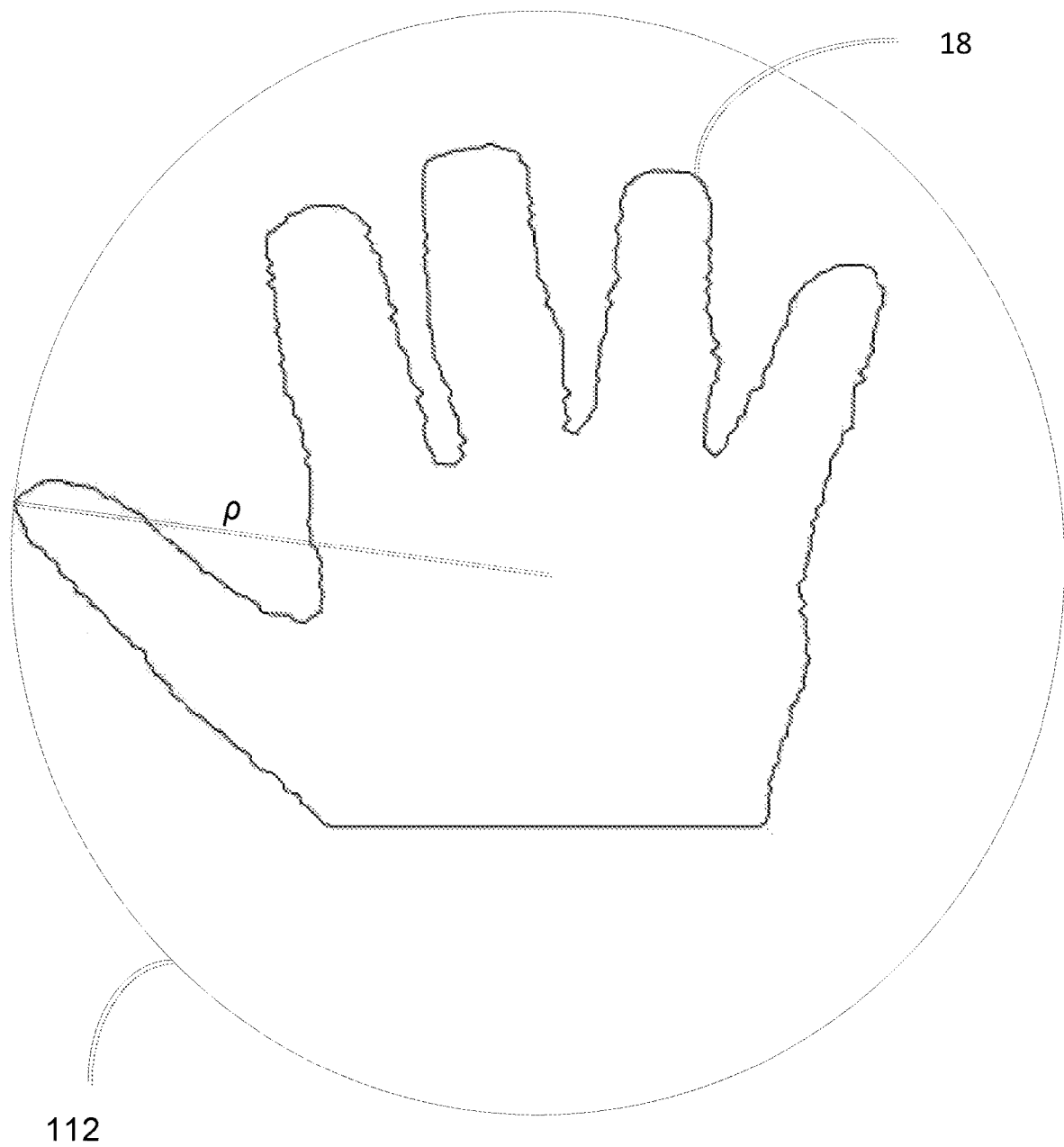
FIG. 4 is illustrating the minimum circumscribed circle, $\rho$, enclosing a hand gesture.

FIG. 4 is illustrating the minimum circumscribed circle, ρ, enclosing a hand gesture.

After identifying the centre of mass of the shape and all of the pixels representing the contour of the shape, the pixel furthest away from the centre of mass of the shape is identified. The Euclidean distance between the centre of mass of the shape and the contour pixel furthest away from the centre of mass is used as the radius, ρ, of the minimum circumscribed circle 112 that encloses the whole shape.

Figure 5:
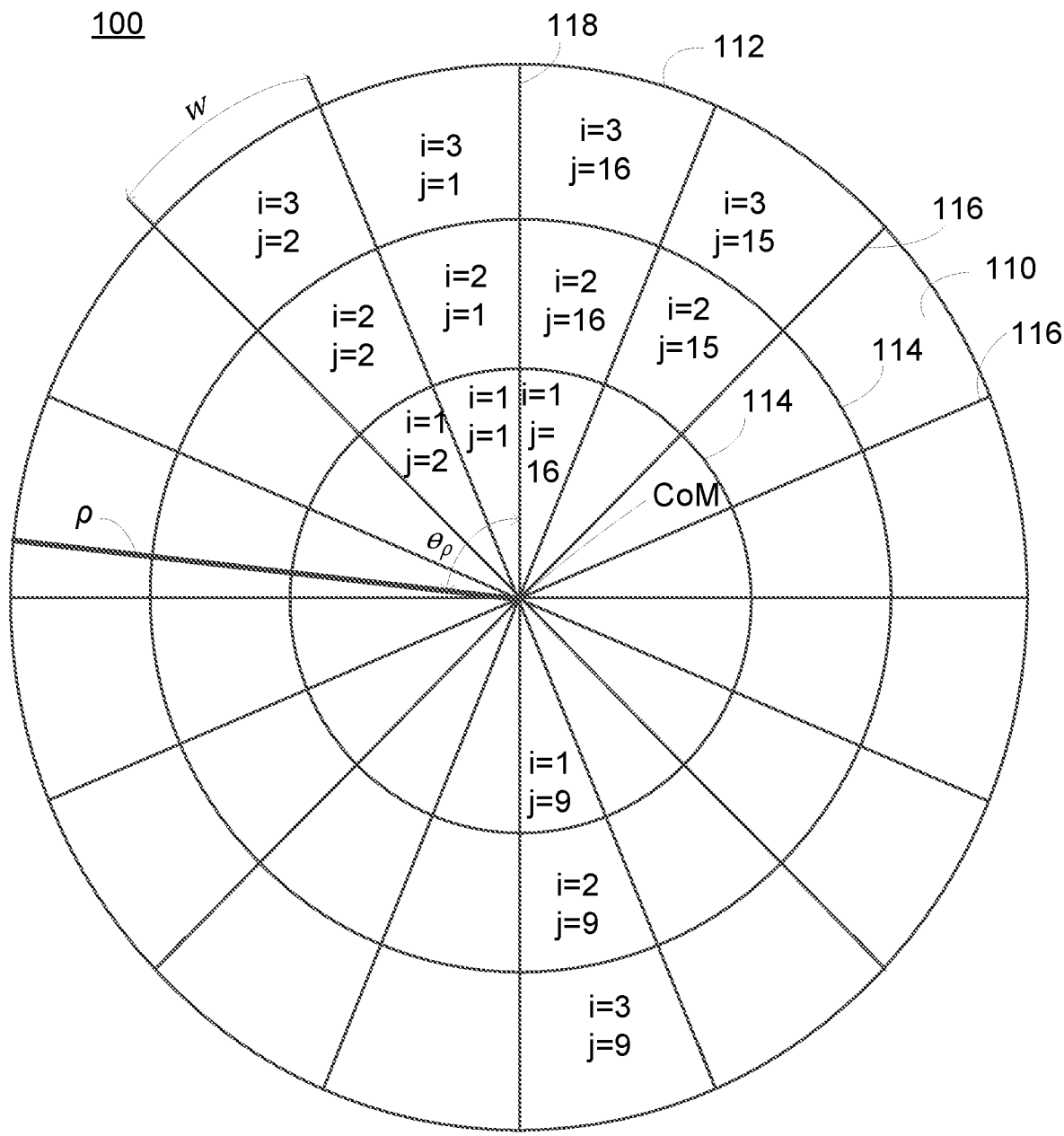
FIG. 5 is illustrating an example of an Angular Radial Bin distribution.

FIG. 5 is illustrating an example of an Angular Radial Bin distribution.

The Angular Radial Bin, ARB, distribution 100 encloses a region, which is enclosed from the circumscribed circle 112. The region is further partitioned into several bins 110 by means of concentric circles 112, 114 and radii 116 separated by an angular length, or angular width and equal angle interval w. The ARB distribution comprises ARBs (i,j) constituted by the angular radial area sections defined within a number of intermediate concentric circles 114, the outer circumscribed circle 112 and the CoM (radius=0) included, being concentric around the Centre of Mass, CoM, of the shape contour and a number of radii 116 starting in the centre of mass and perpendicularly crossing the intermediate concentric circles 114 to the outer circle 112. The radius of the outer circle 112 is equivalent to the largest radial distance ρ from the centre of mass to a contour pixel of the contour pixels.

Each ARB (i, j) 110 has a position (i, j) wherein i=1, 2, . . . I, represents a circular band between two concentric circles CoM, 112, 114 and j=1, 2, 3, . . . , J, represents the angular radial area section within a circular band. The vertical radii 118 pointing towards north serves as a starting reference line, θ=0°, of the ARB distribution. The most distant contour pixel from the centre of mass CoM has the coordinates $(\rho, \theta_\rho)$ in the (r,θ)-plane.

In the example illustrated in FIG. 5, the ARB distribution comprises 3 circular bands i and 16 angular radial area sections j. The angular width of each bin is therefore $$W=360/16=22.5°.$$

The bin positioning in the illustrated example of FIG. 5 is arranged as follows. In this example counter clockwise is the positive direction and clockwise the negative direction. For each angular step j from one bin to the next neighbour bin in the counter clockwise direction from the starting reference line 118 within a band i the increment j is increased from 1 up to J=16, and similarly for each radial step i from one circular band to the neighbour circular band starting from the CoM the increment i is increased from 1 up to I=3. The circular band closest to the CoM is denoted as i=1 and the outer intermediate concentric band limited by the circumscribed circle 112 is denote as i=3. The bin position closest to the starting reference line 118, θ=0°, in the first intermediate concentric band i=1 is (1,1), in the middle intermediate concentric band i=2 the bin position is (2,1), and in the outer intermediate concentric band i=3 the bin position is (3,1).

Of course, the bin positioning system may be arranged in another way compared to the example above, i.e. clockwise direction is positive and the band numbering starts from the outer circle. Further, the ARB distribution described in FIG. 5 above is used as an example since there is no limitation on the amount of concentric circles, circular bands and angular space partitions to be used FIG. 6 is an illustration of an ARB distribution applied to a contour pixel image.

The Angular Radial Bin, ARB, distribution 100 encloses a region, which is enclosed from the circumscribed circle 112. The region is further partitioned into several bins 110 by means of the concentric circles 112, 114 and radii 116 separated by an angular length, or angular width, equal angle interval w. In the example illustrated in FIG. 6, the ARB distribution comprises 2 circular bands i and 16 angular radial area sections j. The angular width of each bin is therefore $$W=360/16=22.5°.$$

The radius of the outer circle 112 is equivalent to the largest radial distance ρ from the centre of mass to a contour pixel of the contour pixels.

Figure 6:
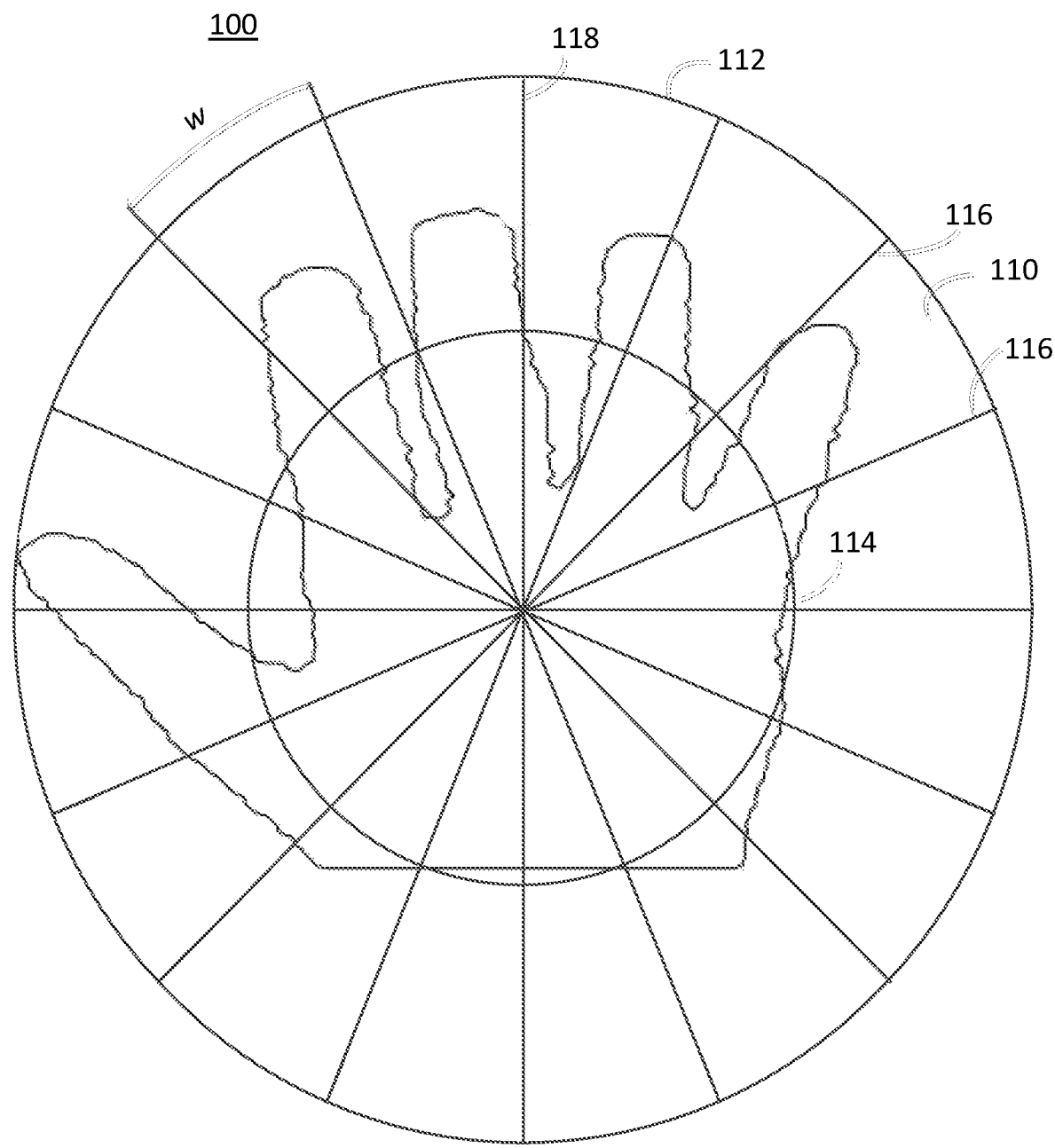
FIG. 6 is an illustration of an ARB distribution applied to a contour pixel image.

As illustrated in the example of FIG. 6, the ARB distribution has been calculated and adapted to the shape contour pixels of a contour pixel image (contour shape in black and the background is white in FIG. 6) as already described above. The shape contour is partitioned into different Angular Radial Bins, ARBs. The distance of every contour pixel to the Centre of Mass, CoM, of the shape is calculated. For each ARB, the accumulative total distance of all contour pixels within an ARB to the CoM represent the weight of that ARB. Three different variations regarding the weight that every ARB holds may be calculated:

Number of contour pixels: The number of contour pixels found in every ARB is added. In order to accommodate the scale invariance, the total number of contour pixels per ARB is scaled by the total mass of the shape.

Accumulative distance: The Euclidean distance from the centre of mass to all the pixels of the contour is calculated. For every ARB the total distance of the contour pixels inside that ARB is calculated. In order to accommodate the scale invariance, the total accumulative distance per ARB is scaled by the total mass of the shape.

Average distance: Instead of giving the total distance of all the contour pixels found in an ARB, the average distance is calculated by dividing the total distance with the number of contour pixels present in each ARB. In order to accommodate the scale invariance, the average distance per ARB is scaled by the total mass of the shape.

It should be noted that the number of concentric circles and the angle space distance can be adjusted and optimized with respect to the problem to get the most accurate results. It can be seen that even though the descriptors look similar there are subtle differences which might indicate that every variation has different performance levels.

In order to increase the robustness and accuracy of the shape matching compared to the use of the simple ARB, described above, a new method for gesture recognition is hereafter provided and described.

Two variations of the simple ARB shape descriptors are provided—overlapping and accumulated ARBs. These are entirely new concepts that have not been found in literature. The way that these shape descriptors work is by obtaining the ARB distribution shape descriptor as described above, however multiple instances of the ARB distribution are applied onto the shape in such a way that the ARB distributions overlap.

Figure 7:
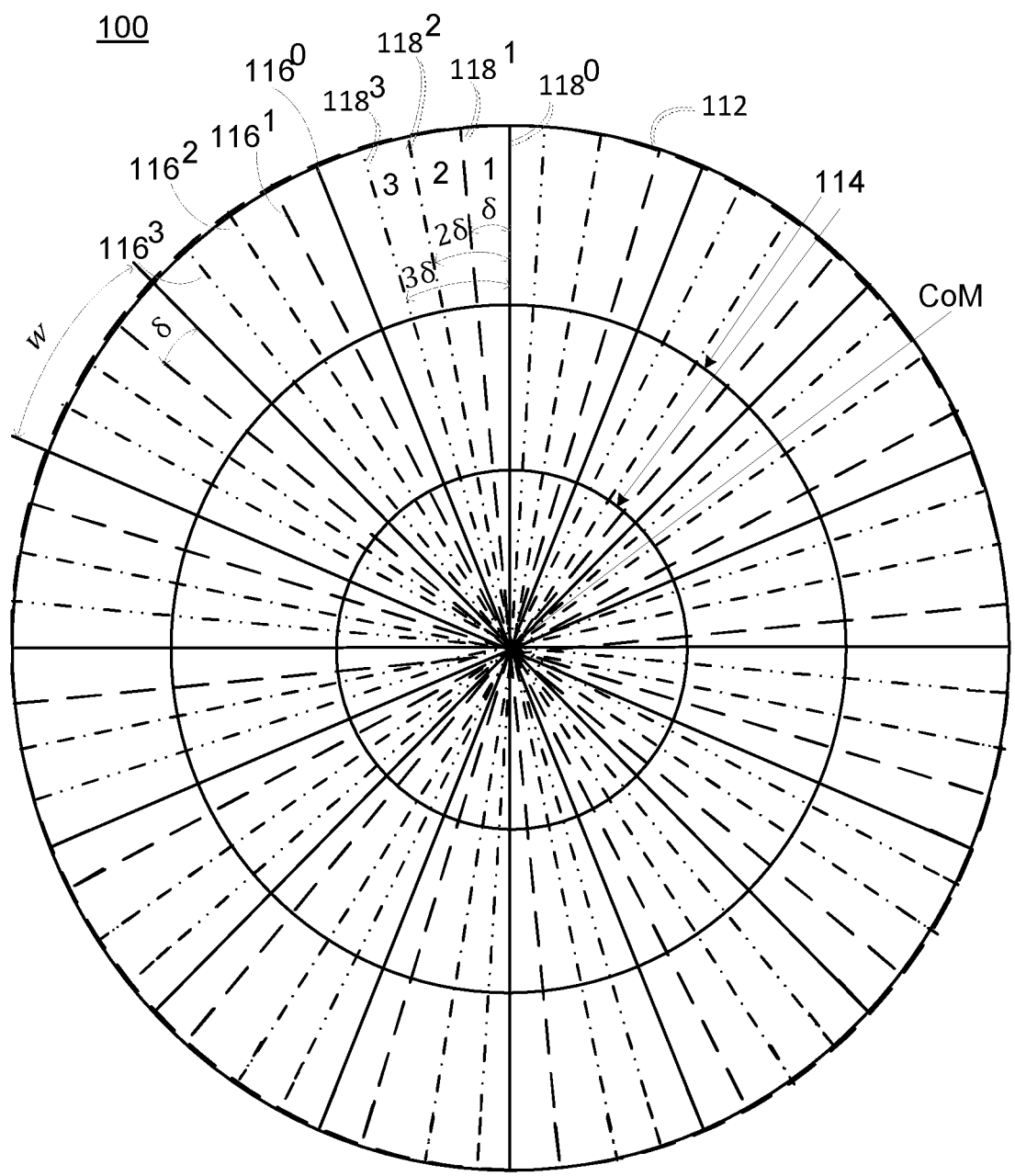
FIG. 7 is an illustration of several ARB shape descriptors according to the new concept used herein.

FIG. 7 illustrates tilted ARB distributions according to the new concept used herein.

A simple ARB distribution of ARB:s has already been described in the text above in connection to the illustration in FIG. 5.

In the example illustrated in FIG. 7, each ARB distribution comprises 3 circular bands i and 16 angular radial area sections j. The angular width of each bin is therefore $$w = 360/16 = 22.5°.$$

Each Angular Radial Bin, ARB, distribution 100 encloses a region, which is enclosed from the circumscribed circle 112. The region is further partitioned into several bins 110 by means of concentric circles 112, 114 and radii 116 separated by an equal angular interval was in FIG. 5. Each ARB distribution comprises ARBs (i,j) constituted by the angular radial area sections defined within a number of intermediate concentric circles 114, the outer circumscribed circle 112 and the CoM (radius=0) included, being concentric around the Centre of Mass, CoM, of the shape contour pixels and a number of radii 116 starting in the centre of mass and perpendicularly crossing the intermediate concentric circles 114 to the outer circle 112. The radius of the outer circle 112 is equivalent to the largest radial distance ρ from the centre of mass to a contour pixel of the contour pixels.

In the illustrated example, four instances of the ARB distributions are applied onto the shape in such a way that the ARBs overlap.

The first ARB distribution is calculated and adjusted to a shape contour wherein the starting reference line 118$^0$ is pointing to the north. A second ARB distribution is added on top of the first ARB distribution with a slight angular tilt δ° of its starting reference line 118$^1$ relative to the starting reference line 118$^0$ of the first ARB distribution. In this way, a number N of instances of the ARBs are added with an accumulative angular tilt of n×δ°, number n of angular steps and it is defined as:

$$(n+1) = \frac{w}{\delta}, \text{ where } n = 0, 1, 2, 3 \ldots, N-1.$$

If (n+1) is greater than the ratio $$\frac{w}{\delta}$$

then some of the instances of the ARB distribution are repeated.

In FIG. 7, the first instance, n=0, of the ARB distribution 100 is indicated by its starting reference line 118$^0$ and the radii 116$^0$ of the ARBs with straight whole lines, the second instance, n=1, of the ARB distribution 100 is indicated by its starting reference line 118$^1$ and the radii 116$^1$ of the ARBs with straight dashed lines, the third instance, n=2, ARB distribution 100 is indicated by its starting reference line 118$^2$ and the radii 116$^2$ of the ARBs with straight dashed-dotted lines, and the fourth instance, n=3, ARB distribution 100 is indicated by its starting reference line 118$^3$ and the radii 116$^3$ of the ARBs with straight dashed-double-dotted lines.

Using the bin positioning as described in the example of FIG. 5, the bin position closest to the starting reference line 118, θ=0°, and the first radius 116 in the counter clockwise direction in the outer intermediate concentric band i=3, i.e. in the bin position is (3,1), will be tilted for each new angular step n.

According to the illustrated example, the instances are tilted in one and the same direction, counter-clockwise.

According to an illustrated example and embodiment herein, the instances are tilted in the same direction, clockwise (or counter-clockwise as described herein before). Instance zero is tilted by δ·0, instance 1 is tilted by δ·1, instance 2 is tilted by δ·2 and so one. All instances are tilted using their center of mass as pivot. After all the tilted instances are tilted, the ARB(i,j) bins are calculated for every ARB distribution instance. The calculated weights of bins ARB in the same position overlapping each other, as belonging to different instances, are added to one calculated weight for said bin position of a 2D-histogram. Said method is described here below; see the text belonging to FIGS. 15 and 16.

A method of using the ARB distribution for improving shape matching and identification of hand gestures will hereafter be described with reference to FIG. 8.

Figure 8:
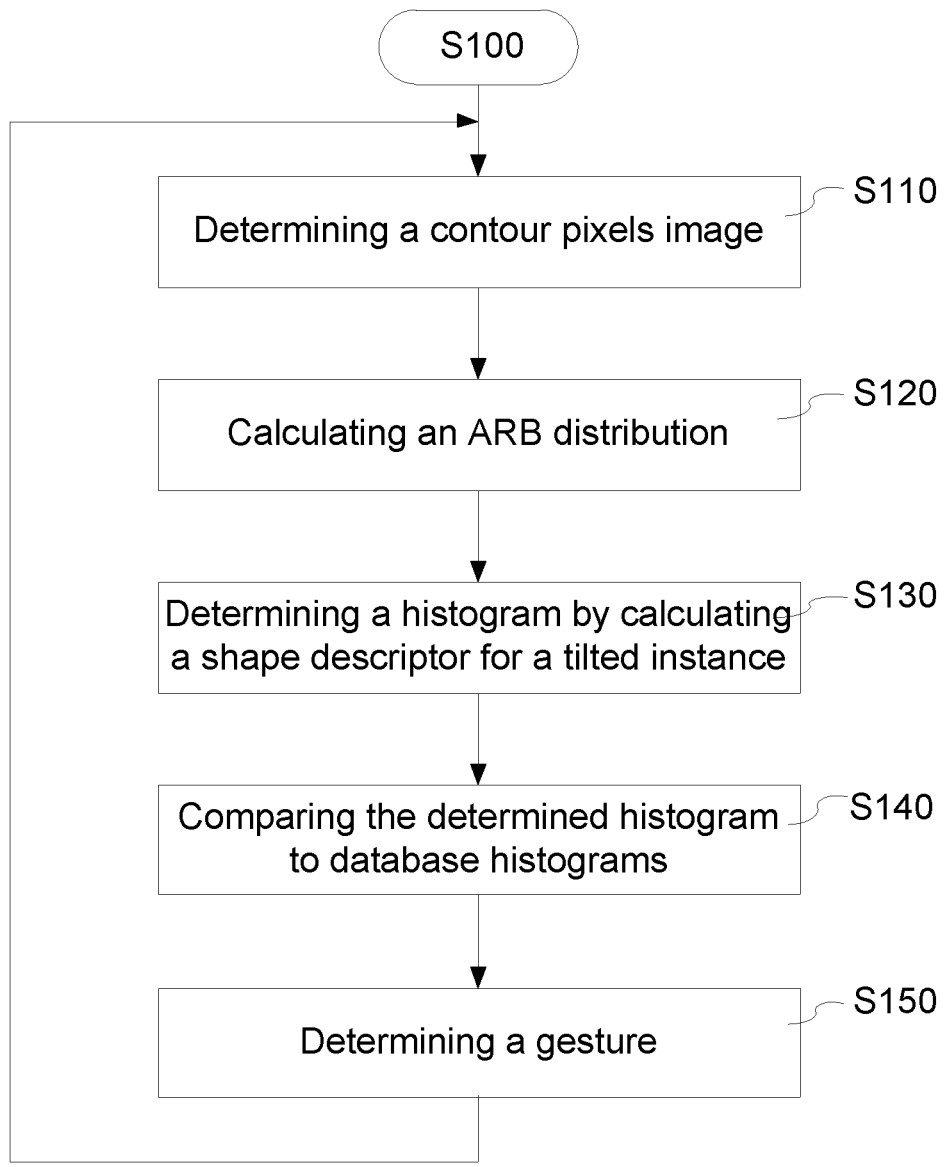
FIG. 8 is a flowchart of the method according to the new concept.

FIG. 8 is a flowchart of the method according to the new concept.

The method for recognizing a gesture is performed in a device having access to a database of histograms. Each histogram is a shape descriptor of a shape contour of a gesture image. The shape descriptor and histogram contain weights of the contour pixels, the weights being calculated by means of the contour pixels within Angular Radial Bins, ARBs. The device is communicating with a sensor adapted to capture an image of a gesture.

The method S100 comprises the steps of:

S110:—Determining a contour pixels image from the captured image of a query gesture;

S120:—Calculating an ARB distribution adapted to the contour pixels image of the gesture;

S130:—Determining a histogram by calculating a shape descriptor for each of an angle tilted instance (n) of the ARB distribution belonging to a sequence of angle tilted instances (n=0, 1, 2, ..., N−1) of the ARB distribution, wherein the weight $h_n(i,j)$ of each ARB(i,j) is based on the contour pixels within the ARB(i,j);

S140:—Comparing the determined histogram of the captured gesture image to the histograms of the database;

S150:—Determining a gesture by selecting the histogram of the database best matching the calculated histogram.

In the first step, S110, of the method, a contour pixels image of the captured image of a gesture is determined. The query gesture is represented by an image, query image, which is digitally processed by a digital processor to a binary image of black and white pixels, see FIG. 2. The contour pixels can be identified by the use of a suitable existing contour algorithm, e.g. the Suzuki algorithm. The calculation will result in a contour pixels image, see FIG. 3. The $0^{th}$ and $1^{th}$ raw moments of the captured image are used for determining the centre of mass and the mass of the image.

In the next step, S120, an ARB distribution adapted to the contour pixels image of the gesture is calculated.

The radius ρ of the outer circle 112 is determined by calculating the largest radial Euclidian distance from the centre of mass to a contour pixel 18 being most far from the centre of mass CoM, and the radial width of the circular bands, i.e. the distance between the intermediate circles, are equidistant. The angular width w of an angular radial area section is $$w = \frac{360}{J},$$

wherein J=the total number of angular radial area sections, i.e. ARBs within a circular band.

The ARB distribution comprises ARBs (i,j) corresponding to angular radial area sections defined within an outer circle and a number of intermediate concentric circles being concentric around a centre of mass of the shape contour and a number of radii starting in the centre of mass and perpendicularly crossing the intermediate concentric circles to the outer circle of radius ρ, wherein each ARB (i, j) has a position (i, j) wherein i=1, 2, ... I, represents a circular band between two concentric circles and j=1, 2, 3, ..., J, represents the angular radial area section within a circular band and n is the order of angular tilted distance (θ=n·δ) from the reference starting line (0°) of the ARB distribution.

Figure 9:
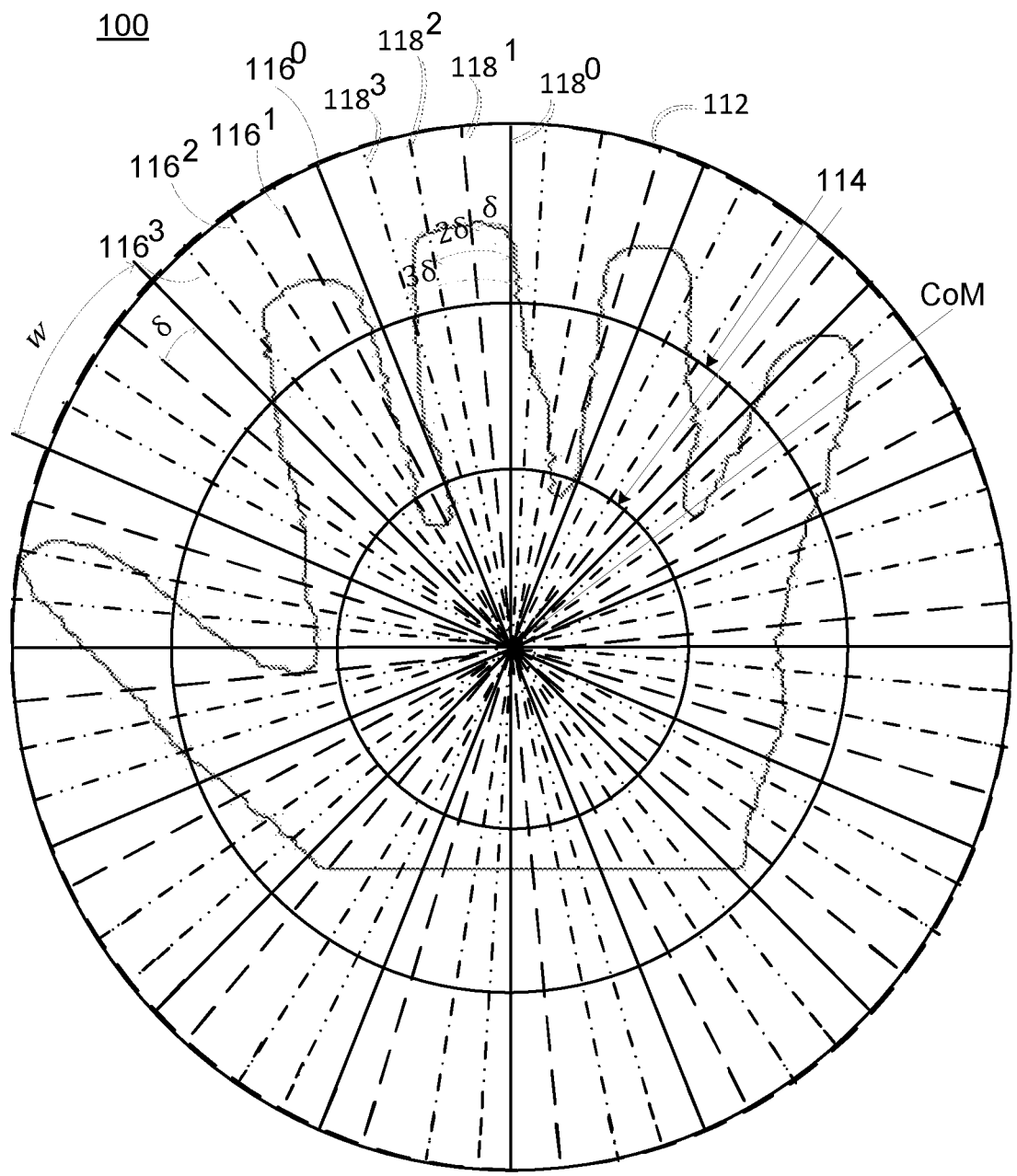
FIG. 9 is an illustration of several ARB shape descriptors adapted to a contour pixels image according to the new concept used herein.

FIG. 9 is illustrating an ARB distribution being angle tilted several times according to the new concept used herein. The ARB distribution is the same as in FIG. 7, see therefore the description presenting FIG. 7 herein for detailed description of FIG. 9. Each instance of the ARB distribution enables a calculation of an ARB shape descriptor. The ARB distribution in FIG. 9 is adapted to a contour pixels image.

In step S130, a histogram is determined by calculating a shape descriptor for each of an angle tilted instance (n) of the ARB distribution belonging to a sequence of angle tilted instances (n=0, 1, 2, ..., N−1), wherein the weight $h_n(i,j)$ of each bin ARB(i,j) is based on the contour pixels within the ARB(i,j).

The weight $h_n(i,j)$ of a bin ARB (i,j) could be obtained in different ways.

Figure 10:
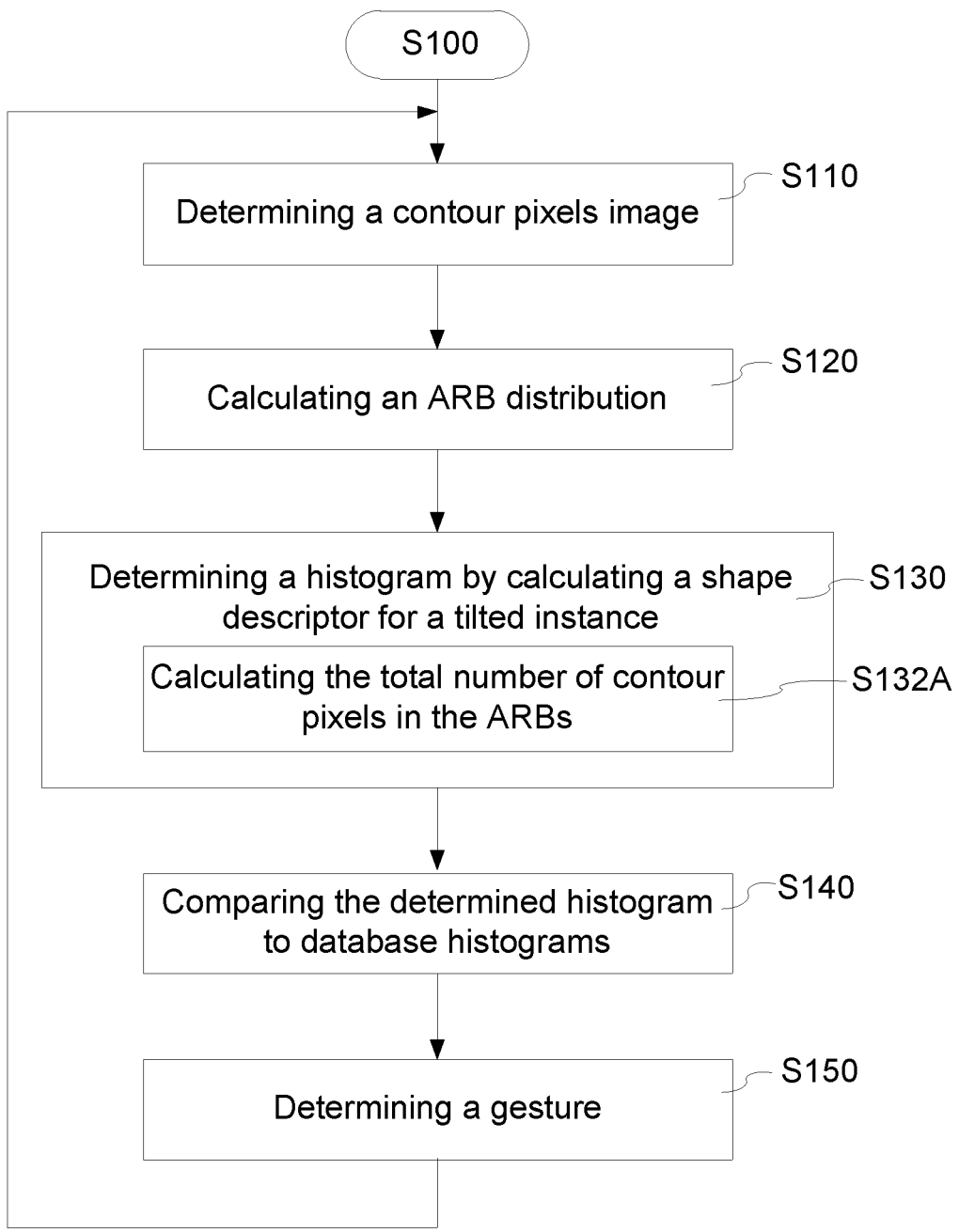
FIG. 10 is a flowchart of an embodiment of the method illustrated in FIG. 8.

FIG. 10 is a flowchart of an embodiment of the method illustrated in FIG. 8.

According to one embodiment, the weight $h_n(i,j)$ of a bin ARB(i,j) is obtained by:

S132A:—Calculating the total number of contour pixels found in the ARB (i,j).

The total number of contour pixels per ARB(i,j) may be scaled by dividing the total mass of the binary image to obtain scale invariance.

Figure 11:
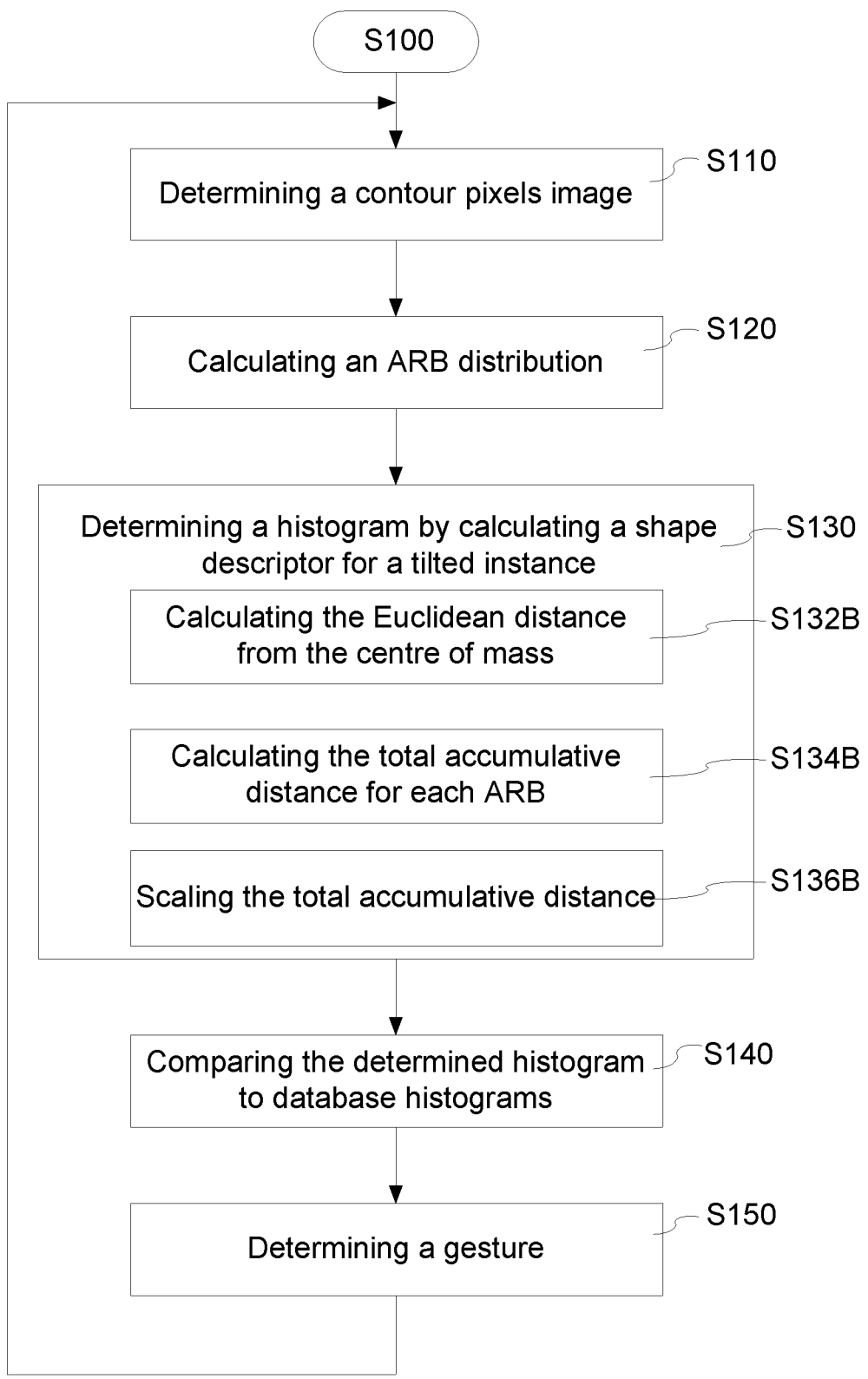
FIG. 11 is a flowchart of yet an embodiment of the method illustrated in FIG. 8.

FIG. 11 is a flowchart of yet an embodiment of the method illustrated in FIG. 8.

According to another embodiment, the weight $h_n(i,j)$ of a bin ARB (i,j) is the accumulative distance, which is obtained by:

S132B:—Calculating the Euclidean distance from the centre of mass to all the pixels of the contour shape;

S134B:—calculating the total accumulative distance for each ARB(i,j) by adding the Euclidean distances from the centre of mass to all the pixels of the contour pixels inside the ARB(i,j).

To obtain scale invariance, the calculation of the total accumulative distance for each bin ARB(i,j) further involves the step of:

S136B:—Scaling by dividing the total accumulative distance for each ARB(i,j) by means of the total mass of the binary image.

Figure 12:
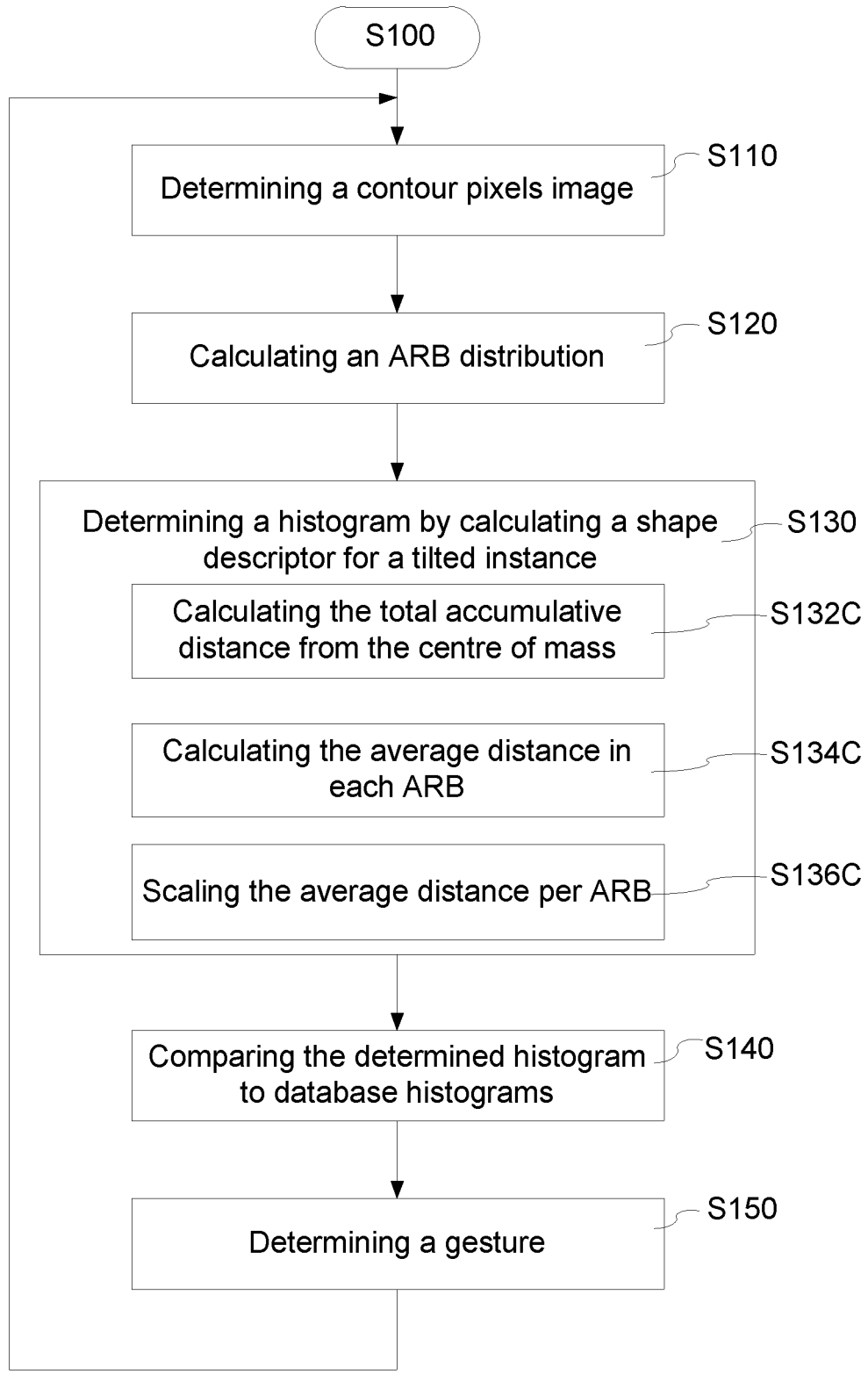
FIG. 12 is a flowchart of further one embodiment of the method illustrated in FIG. 8.

FIG. 12 is a flowchart of further one embodiment of the method illustrated in FIG. 8.

According to yet another example, the weight $h_n(i,j)$ of I bin ARB (i,j) is obtained as the average distance by:

S132C:—calculating the total accumulative distance for each ARB (i,j) by adding the Euclidean distances from the centre of mass to all the pixels of the contour shape inside the ARB(i,j);

S134C:—calculating the average distance by dividing the total distance with the number of contour pixels present in each ARB(i,j);

S136C:—Scaling by dividing the average distance per ARB (i,j) with the total mass of the binary image.

The histogram is determined by using the calculated shape descriptors. Two kinds of methods may be used, overlapping bins and accumulative bins.

Figure 13:
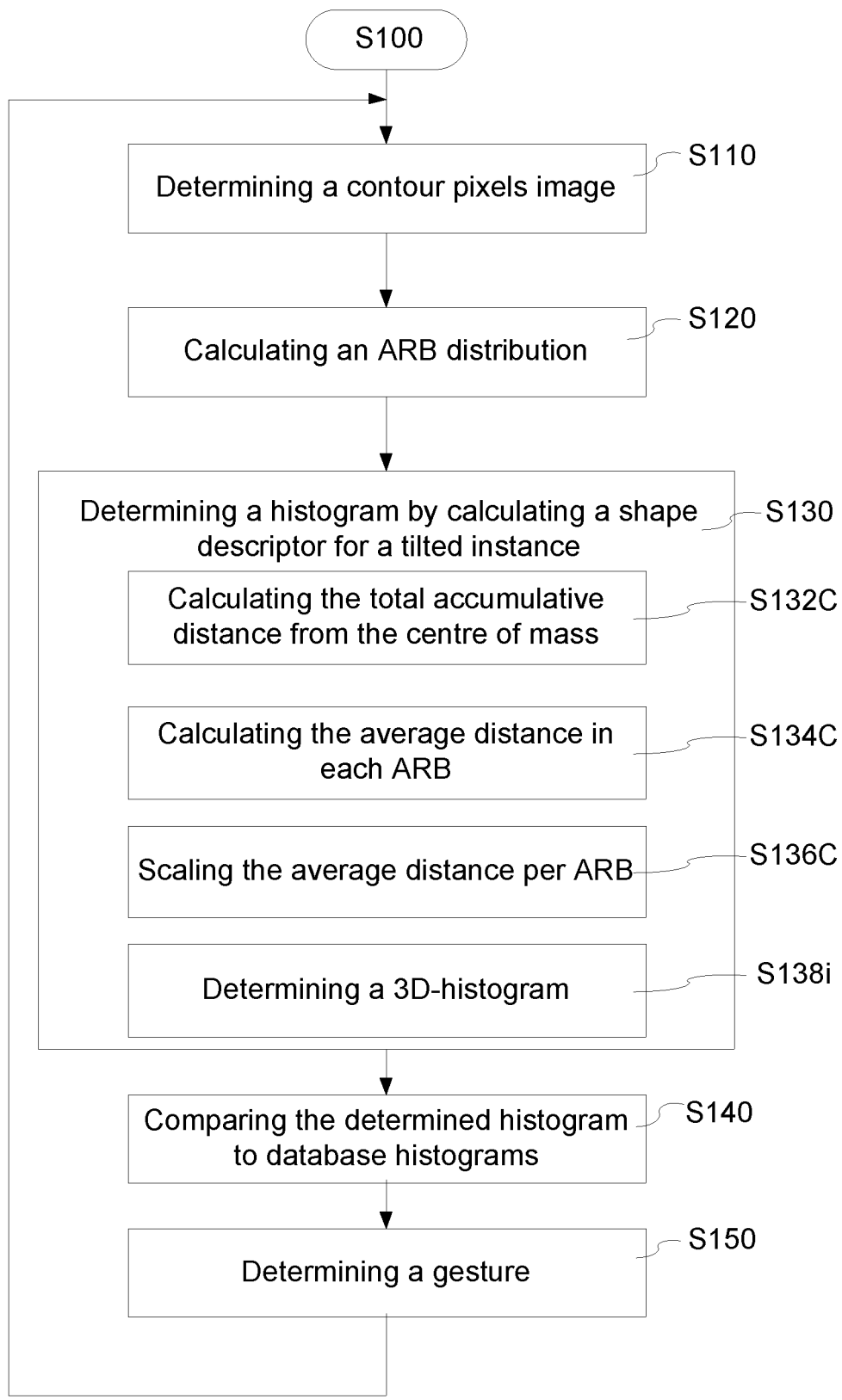
FIG. 13 is a flowchart of another embodiment of the method illustrated in FIG. 8.

FIG. 13 is a flowchart of another embodiment of the method illustrated in FIG. 8.

According to the embodiment wherein overlapping bins, i.e. ARBs, are used, the step of calculating a histogram using the calculated shape descriptors involves:

S138i:—Determining a 3D-histogram in a (i, j, n)-space comprising the shape descriptors of all N angle tilted instances, wherein i=1, 2, ... I, represents a circular band between two concentric circles and j=1, 2, 3, represents the angular radial area section within a circular band and is the order (n=0, 1, 2, ..., N−1) of angular tilted distance (w=n·δ) from a reference starting line (0°) of the ARB distribution.

Thus, for each instance order n, there is a corresponding shape descriptor calculated. If a 3D-histogram is determined using N angle tilted instances, said histogram comprises N shape descriptors.

Figure 14:
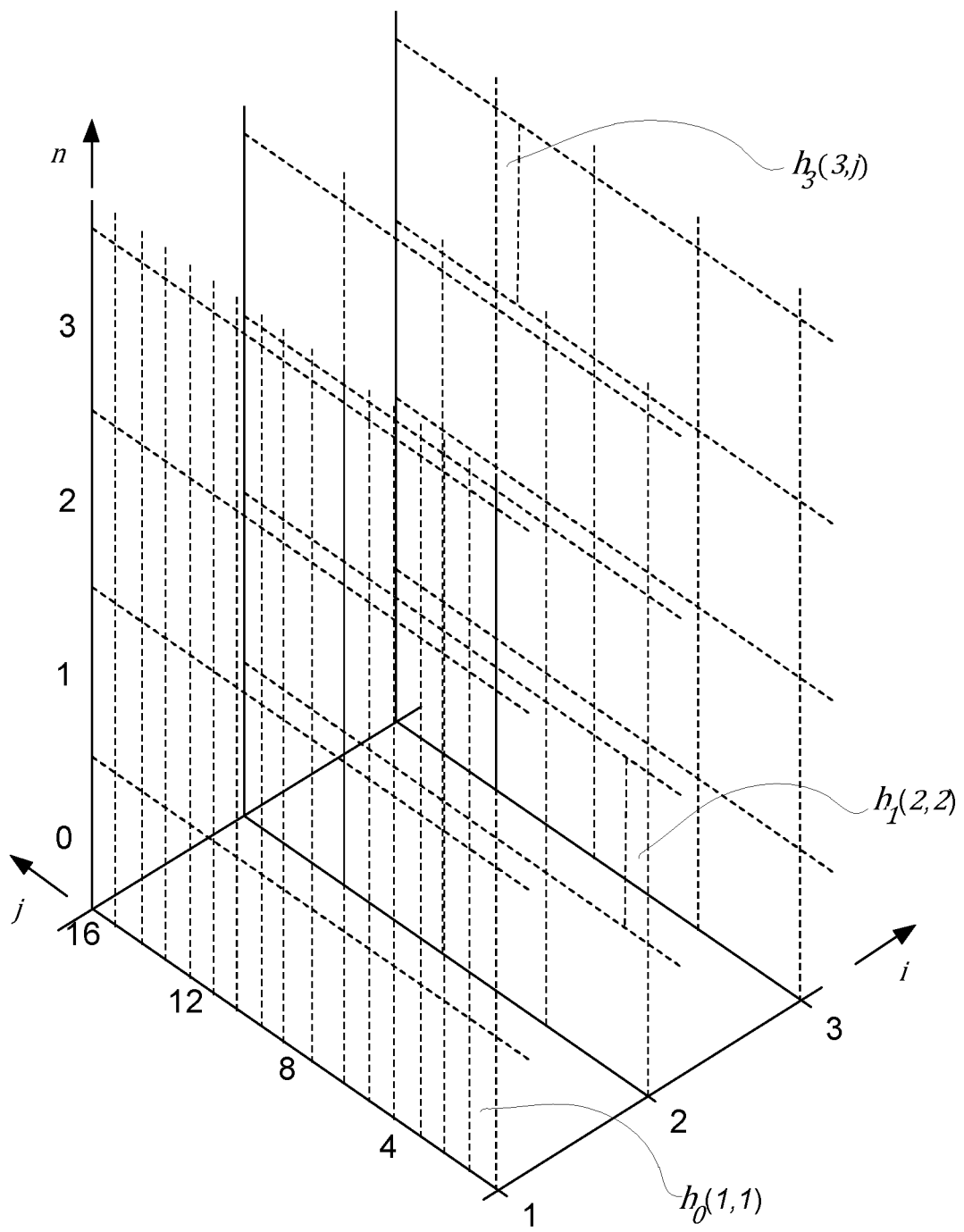
FIG. 14 is an illustration of a 3D-histogram of overlapping ARBs.

FIG. 14 is an illustration of a 3D-histogram of overlapping ARBs.

The illustrated example of a histogram in FIG. 14 is a histogram in three dimensions wherein (i, j, n)-space which comprises the calculated weights $h_n(i,j)$ of an ARB(i,j) in a position (i, j) of a tilted ARB distribution of instance n. Each direction in the histogram is illustrated by an axis and an arrow. The vertical direction of the histogram is the n-axis. The two horizontal axes are the j-axis and i-axis constituting of the (i, j)-plane. The positions of the weights $h_n(i,j)$:s are indicated by means of dashed-lines which together constitute a mesh of spaces, each space comprising a corresponding weight. Thus, a position (i, j, n) in the histogram corresponds to an ARB in position (i,j) of a tilted ARB distribution of instance n. Each horizontal (i, j)-plane of an instance n, i.e. level n in the histogram, comprises the weights $h_n(i,j)$:s of an ARB shape descriptor of the angle tilted ARB distribution.

Figure 15:
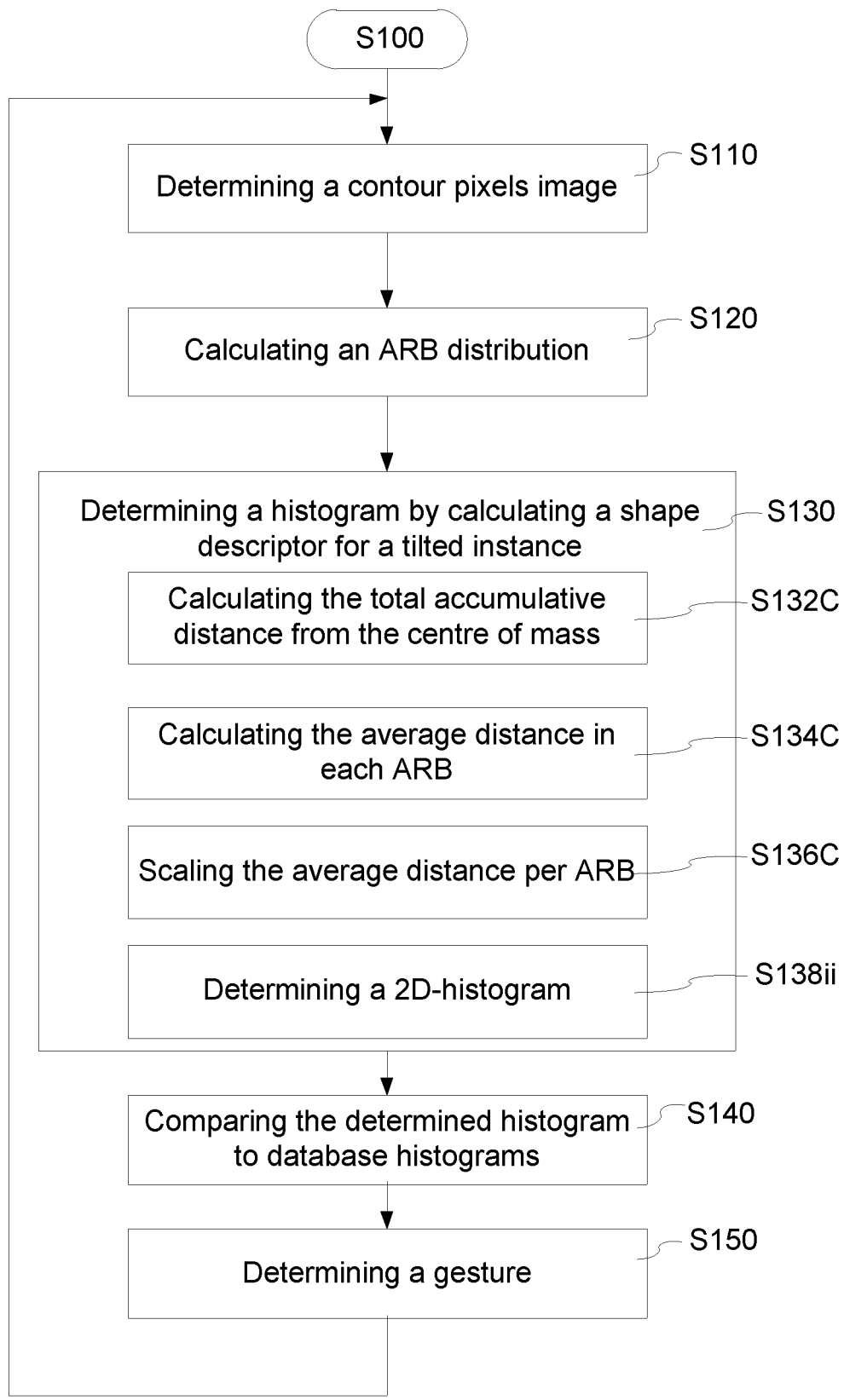
FIG. 15 is a flowchart of an additional embodiment of the method illustrated in FIG. 8.

In more detail, the histogram in FIG. 15 is the result of a calculation of weights of the angle tilted ARB distributions as illustrated in the example of FIG. 9. Each angle tilted ARB distribution comprises 4 tilt instances, n=0, 1, 2, and 3, 3 concentric bands i=1, 2 and 3, (I=3), and 16 angular radial area sections j=1, 2, 3, . . . , 16, (J=16).

According to the other example wherein accumulative bins, i.e. accumulative ARBs, are used.

FIG. 15 is a flowchart of an additional embodiment of the method illustrated in FIG. 8.

The accumulative ARB distribution method may be used if the different instances n of the ARB distribution is tilted with the tilt angle both clockwise and counter-clockwise, The step of calculating a histogram using the calculated shape descriptors involves:

S138ii:—Calculating the weights of h(i,j) of the shape descriptor of a 2D-histogram in a (i, j)-plane, wherein the weights $h_n(i,j)$:s of overlapping bins ARB (i, j) in the same position (i, j) of different instances n, are added together to one single weight h(i, j) by using the equation:

$$h(i, j) = \sum_{n=0}^{N-1} h_n(i, j)$$

wherein i=1, 2, . . . I, represents a circular band between two concentric circles and j=1, 2, 3, . . . , I represents the angular radial area section within a circular band and n is the order of angular tilted distance (θ=n·δ) from a reference starting line (0°) of the ARB distribution.

According to an illustrated example and embodiment herein, the instances are tilted in the same direction, clockwise (or counter-clockwise as described herein before). Instance zero is tilted by δ·0, instance 1 is tilted by δ·1, instance 2 is tilted by δ·2 and so one. All instances are tilted using their center of mass as pivot. After all the tilted instances are tilted, the ARB(i,j) bins are calculated for every ARB distribution instance. The calculated weights of bins ARB in the same position overlapping each other, as belonging to different instances, are added to one calculated weight for said bin position of a 2D-histogram. The calculation will result in a 2D-histogram which is illustrated in FIG. 16.

Figure 16:
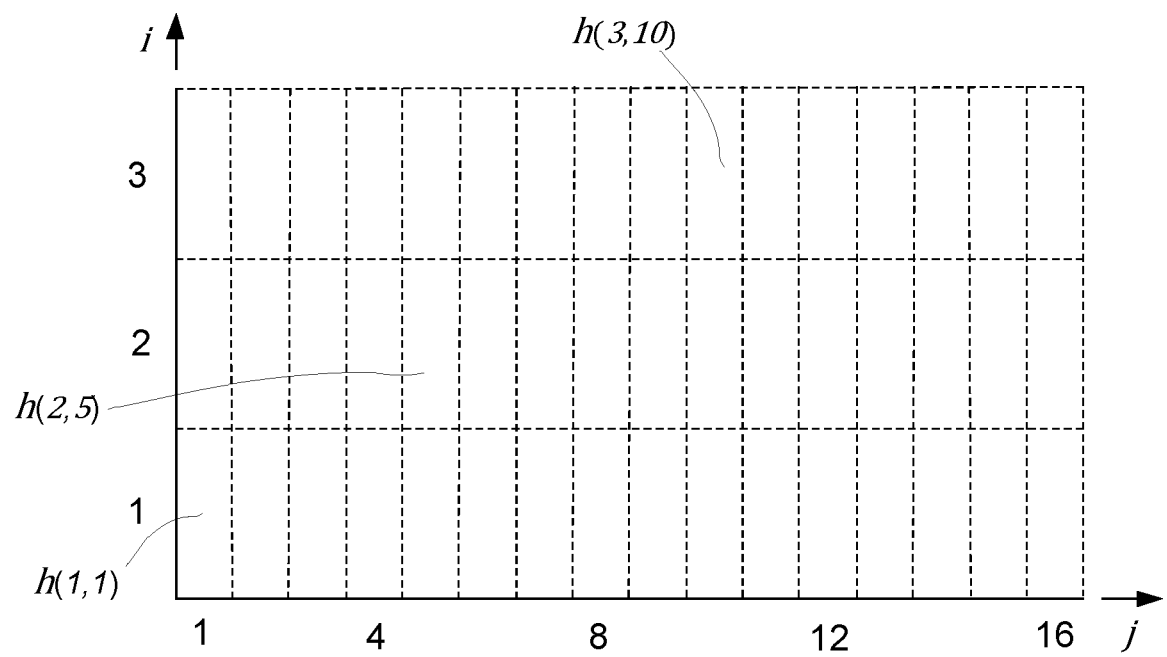
FIG. 16 is an illustration of a 2D-histogram of accumulative ARBs.

FIG. 16 is illustrating a 2D-histogram of accumulative ARBs.

The illustrated example of a histogram in FIG. 16 is a histogram of two dimensions wherein (i, j)-plane which comprises the calculated weights h(i,j) of an ARB(i,j) in a position (i, j) of overlapping ARB distributions creating accumulative bins. Each direction in the histogram is illustrated by an axis and an arrow. The two axes are the j-axis and i-axis constituting of the (i, j)-plane. The positions of the weights h(i,j) are indicated by means of dashed-lines which together constitute a mesh of spaces, each space comprising a corresponding weight. Thus, a position (i, j) in the histogram corresponds to an ARB in position (i,j) of overlapping ARB distributions of all instances n. The (i, j)-plane of the 2D-histogram comprises the weights h(i,j):s of an ARB shape descriptor of the overlapping ARBs of the ARB distribution, as described above.

Regarding the method S100, as illustrated in FIG. 8, in step S140 the determined histogram of the captured gesture image is compared to the histograms of the database.

Different criteria may be used to determine similarity between the histogram of the query shape and the histograms of the database. According to one example, the comparison of the calculated histogram of the captured gesture image to the histograms of the database may be performed by calculating the Euclidian distance between two of the corresponding shape descriptors of each shape.

The method is ended by, in S150, determining a gesture by selecting the histogram of the database best matching the calculated histogram.

When a hand gesture has been determined and recognized by the method S100, the determined gesture may be used for controlling in real-time a device, such as a smart device, e.g. mobile devices, stationary devices, wearable devices, game consoles, media players, smart TVs, etc. A series of hand gestures are captured and each hand gesture of the series of captured hand gestures is recognized by means of the described method S100 resulting in a series of determined hand gestures. Said series of hand gestures could then be used for controlling the device.

The above described method for recognizing a gesture of a hand may be implemented in digital electronic circuitry, or in computer hardware, firmware, software, or in combinations of them. A device wherein the method S100 is used may be implemented in a computer program product tangibly embodied in a machine readable storage device for execution by a programmable processor; and method steps of the invention may be performed by a programmable processor executing a program of instructions to perform functions of the method S100 by operating on input data and generating output.

The method S100 may advantageously be implemented in one or more computer programs that are executable on a programmable system including at least one programmable processor unit coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially-designed ASICs (Application Specific Integrated Circuits).

Figure 17:
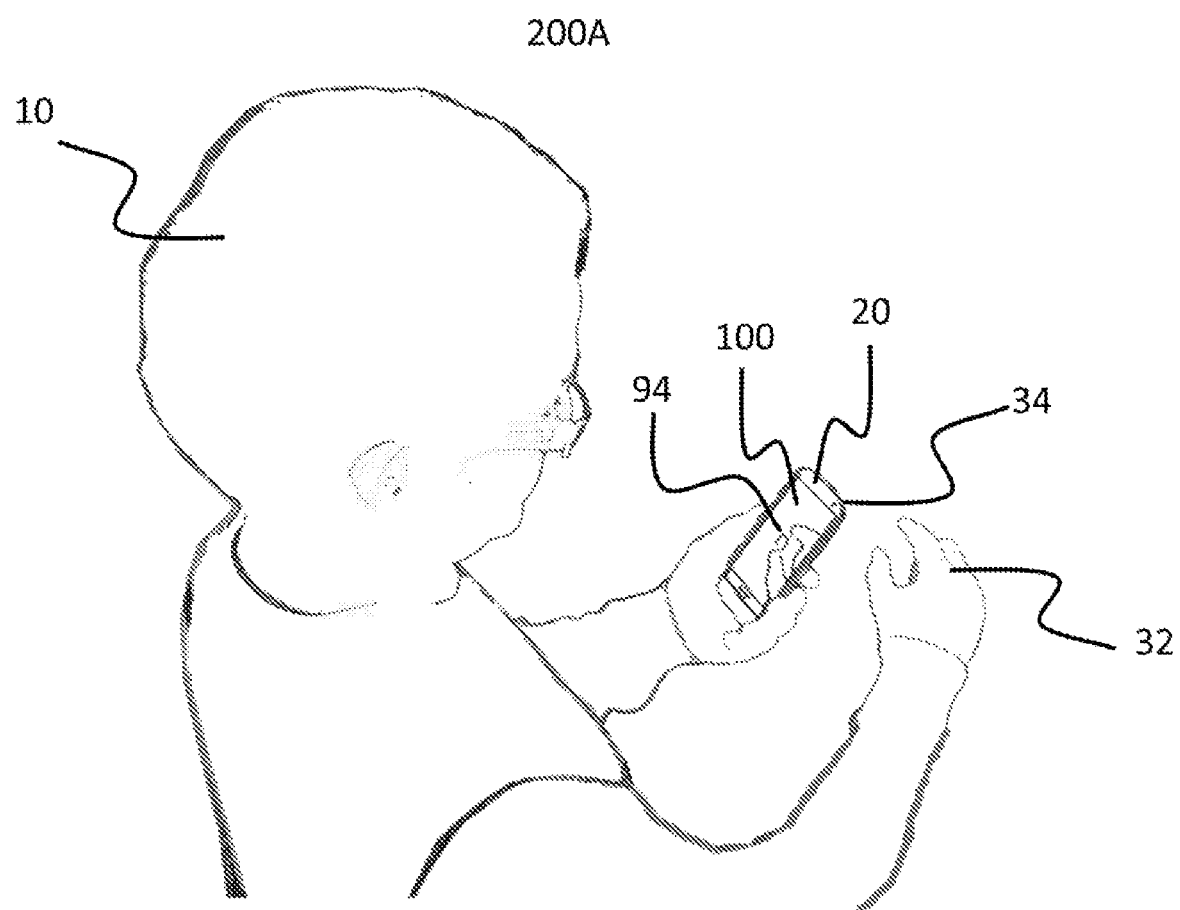
FIG. 17 is a schematic illustration of a user interface system 200A, in accordance with an embodiment of the present concept.

FIG. 17 is a schematic illustration of a user interface system 200A, in accordance with an embodiment of the present concept. The user interface is based on a smart device 20 of any kind (mobile, stationary, wearable etc.) equipped with sensor/s of any type 34 (e.g. 2D/3D camera, ultra sonic, 3D depth camera, IR camera), which is able to capture a 3D scene information behind, in front of, and/or around the device 20, that includes a gesture 32, e.g. hand, head, or body gesture of a human user 10. In order to detect/recognize the gesture 32 (hand/head/body gesture), smart device 20 captures the gesture images with sufficient resolution to enable the gesture 32 (hand/head/body gesture) and its specific position and orientation to be extracted. In addition to gesture 32 (hand/head/body gesture), captured image, query image typically includes other body parts and/or cluttered background.

According to one example, the interface is a mobile device 20 that comprises of a storing unit (not shown), a processing unit (not shown), sensor 34 (e.g. 2D/3D camera, IR sensor, ultra sonic etc.), and a display 100. The mobile device 20 captures a sequence of query inputs and processes them to retrieve indexable features 36. The storing unit stores the database of 2D- and/or 3D-histograms of gesture maps. The processing unit 24 also modifies output visual content (2D/3D) 94 presented on the display 100 in response to user gesture 32 performances.

The display 100 displays an application running on the mobile device 20. The application may include 2D/3D video game, 2D/3D object modeling/rendering, photo browsing, map, navigation etc. presented on the display 100. The user 10 perceives output visual contents (2D/3D) 94 on the display 100 which are continuously being modified in response to user gesture 32 performances.

In FIG. 17 system 200A is configured to capture and process a sequence of query images containing user's gesture 32 (hand/head/body gesture). While the user 10 performs a gesture 32 (hand/head/body gesture), system 200A recognizes the user's gesture 32 (hand/head/body gesture) of the sequence of query images 33. Software running on a processing unit in device 20 processes the image sequence to determine contour pixels images of each of the user gestures 32 in each query image, calculates an ARB distribution and a shape descriptor for each of an angle tilted instance, and calculates a 2D and/or 3D histogram by means of the shape descriptors. The software matches the calculated a 2D and/or 3D histogram to the database of 2D and/or 3D histograms in order to find the best match for the query images. Database is composed of millions of 2D or 3D histograms of images of hand gestures.

The database of 2D and/or 3D histograms may be a large-scale matrix of 2D and/or 3D histograms from gesture images.

As an alternative, all or some of these processing functions may be carried out by a suitable processor that is integrated with any other computerized device, such as a game console, media player, smart TVs etc. Any computerized apparatus equipped by capture sensor 34 (2D/3D camera, IR sensor, ultra sonic etc.), storing unit, and processing unit, can utilize at least some of the mentioned functions to provide better user interface system.

Figure 18:
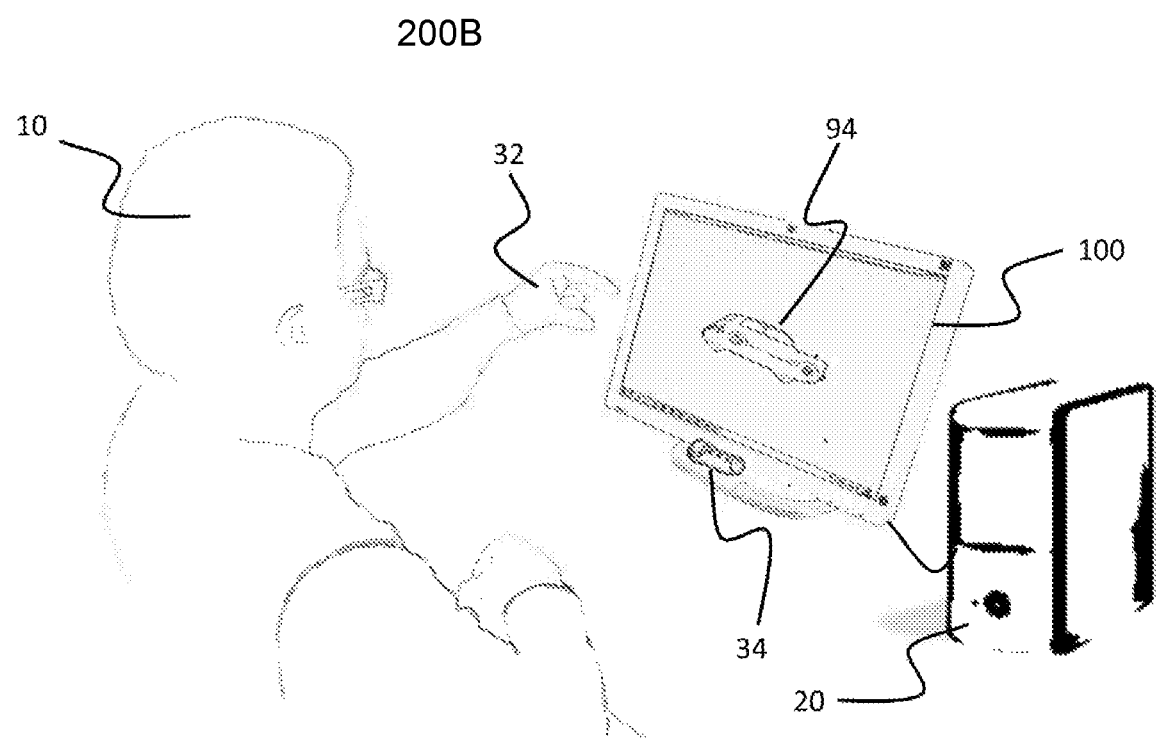
FIG. 18 is a schematic illustration of a user interface system 200B, in accordance with an embodiment of the present concept.

FIG. 18 is a schematic illustration of a user interface system 200B, in accordance with an embodiment of the present concept. The interface is a stationary device 20 that comprises of a storing unit (not shown), a processing unit (not shown), a sensor 34 (2D/3D camera, IR sensor, ultra sonic etc.), and a display 100. Sensor 34 captures 3D scene information in front of stationary device 20. Stationary device 20 captures a sequence of query inputs and processes them to determine 2D and/or 3D histograms. Storing unit stores the database of 2D and/or 3D histograms of the gesture maps. Processing unit performs the method S100 for recognizing a gesture in real-time.

The processing unit may also modify output visual content (2D/3D) 94 presented on a display 100 in response to user gesture 32 performances. Display 100 displays an application running on stationary device 20. Application may include 2D/3D video game, 2D/3D object modeling/rendering, photo browsing, map, navigation etc. presented on display 100. User 10 perceives output visual contents (2D/3D) 94 on the display 100 which are continuously being modified in response to user gesture 32 performances.

The method S100 illustrated in FIG. 8 may also analyze 2D or 3D histograms of gesture maps 73 over multiple frames in a sequence.

The system may also include motion tracking functions to track user gestures 32 over a sequence of query inputs, so that the method S100 illustrated in FIG. 8 may optionally be performed only once in every two (or more) frames.

Detected/recognized hand gestures 32 are provided via Application Programming Interface (API) to an application program running on device 20. This program may, for example, move and modify images, 3D objects, or other 2D/3D visual content 94 presented on display 100 in response to the performed gesture/s 32.

Figure 19:
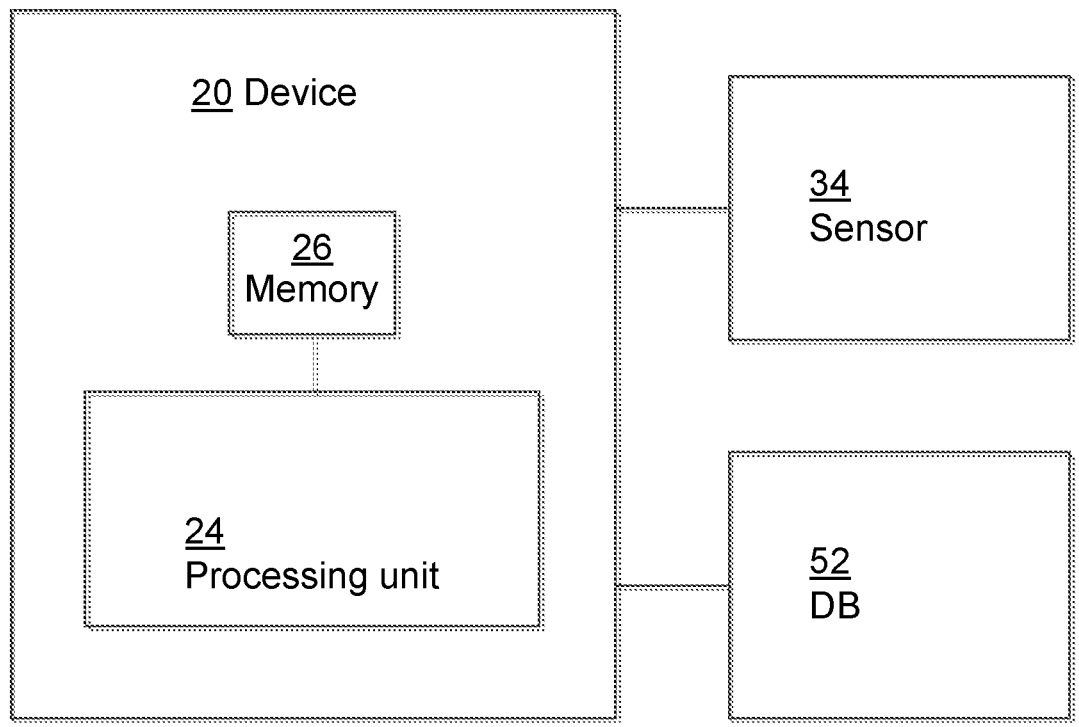
FIG. 19 is a block diagram schematically illustrating the device 20 for recognizing a hand gesture according to embodiments of the present concept.

FIG. 19 is a block diagram schematically illustrating the device 20 for recognizing a hand gesture according to embodiments of the present concept. The device 20 is configured to have access to a database 52 of gesture images comprising 2D and/or 3D histograms. The device is connectable to a sensor 34 configured to capture an image of a user hand gesture. The sensor 34 may be comprised in the device 20, or it may be separate from the device. The device 20 comprises a processing unit configured to capture an image of the hand gesture, the image being a binary image, via the sensor, and determine a contour pixels image from the binary image. The processing unit 24 is further configured to calculate an ARB distribution adapted to the contour pixels image of the gesture.

The processing unit 24 is further configured to determine a histogram by calculating a shape descriptor for each of an angle tilted instance (n) of the ARB distribution belonging to a sequence of angle tilted instances (n=0, 1, 2, . . . , N−1) of the ARB distribution, wherein the weight $h_n(i,j)$ of each ARB(i,j) is based on the contour pixels within the ARB(i,j).

The processing unit is also configured to compare the determined histogram of the captured gesture image to the histograms of the database, and to determine a gesture by selecting the histogram of the database best matching the calculated histogram.

The device 20 may in embodiments comprise a memory associated with the processing unit 24, which memory 26 contains instructions executable by said processing unit 24 whereby the device is operative to communicate with a sensor 34 adapted to capture an image of a gesture, to determine a contour pixels image from the captured image of a query gesture, to calculate an ARB distribution adapted to the contour pixels image of the gesture, to determine a histogram by calculating a shape descriptor for each of an angle tilted instance (n) of the ARB distribution belonging to a sequence of angle tilted instances (n=0, 1, 2, . . . , N−1) of the ARB distribution, wherein the weight $h_n(i,j)$ of each ARB(i,j) is based on the contour pixels within the ARB(i,j), to compare the determined histogram of the captured gesture image to the histograms of the database 52, and to determine a gesture by selecting the histogram of the database best matching the calculated histogram.

The device 20 may also comprise an interface circuit connected to the processing unit and configured to communicate with the sensor 34 and/or the database.

In an alternative way to describe the embodiment in FIG. 19, the device 20 may comprise means of capturing the image of the hand gesture via the sensor 34, means for determining a contour pixels image from the captured image of a query gesture, means for calculating an ARB distribution adapted to the contour pixels image of the gesture, means for determining a histogram by calculating a shape descriptor for each of an angle tilted instance (n) of the ARB distribution belonging to a sequence of angle tilted instances (n=0, 1, 2, ..., N−1) of the ARB distribution, wherein the weight $h_n(i,j)$ of each ARB(i,j) is based on the contour pixels within the ARB(i,j); means for comparing the determined histogram of the captured gesture image to the histograms of a database 52, and means for determining a gesture by selecting the histogram of the database best matching the calculated histogram.

The means described are functional units which may be implemented in hardware, software, firmware or any combination thereof. In one embodiment, the means are implemented as a computer program running on a processor.

A number of examples of the present method and device have been described. It will be understood that various modifications may be made without departing from the scope of the following claims. Therefore, other implementations are within the scope of the following claims.

The invention claimed is:

1. A method for recognizing a gesture in real-time, the method being performed in a device having access to a database of histograms, each histogram being a shape descriptor of a shape contour of a gesture image, each shape descriptor and histogram containing weights of the contour pixels, the weights being calculated by means of the contour pixels within Angular Radial Bins, ARBs, the device is communicating with a sensor adapted to capture an image of a gesture, the method comprising the steps of:
   determining a contour pixels image from the captured image of a query gesture;
   calculating an ARB distribution adapted to the contour pixels image of the gesture;
   determining a histogram by calculating a shape descriptor for each of an angle tilted instance (n) of the ARB distribution belonging to a sequence of angle tilted instances (n=0, 1, 2, ..., N−1) of the ARB distribution, wherein the weight $h_n(i,j)$ of each ARB (i,j) is based on the contour pixels within the ARB(i,j);
   comparing the determined histogram of the captured gesture image to the histograms of the database; and
   determining a gesture by selecting the histogram of the database best matching the calculated histogram.

2. The method according to claim 1, the ARB distribution comprises ARBs (i,j) corresponding to angular radial area sections defined within an outer circle and a number of intermediate concentric circles being concentric around a centre of mass of the shape contour and a number of radii starting in the centre of mass and perpendicularly crossing the intermediate concentric circles to the outer circle which radius being equivalent to the largest radial distance from the centre of mass to a contour pixel of the contour pixels, wherein each ARB (i, j) has a position (i, j) wherein i=1, 2, ... I, represents a circular band between two concentric circles and j=1, 2, 3, ..., J, represents the angular radial area section within a circular band and n is the order of angular tilted distance (θ=n·δ) from a reference starting line(0°) of the ARB distribution.

3. The method according to claim 2, wherein the $0^{th}$ and $1^{th}$ raw moments of the captured image are used for determining the centre of mass and the mass of the binary image.

4. The method according to claim 2, wherein the radius ρ the outer circle is determined by calculating the largest radial Euclidian distance from the centre of mass to the contour pixel furthest away from the centre of mass, and the radial width of the circular bands are equidistant.

5. The method according to claim 2, wherein the angular width w of an angular radial area section is $$w = \frac{360}{J},$$

wherein J=the total number of angular radial area sections within a circular band.

6. The method according to claim 1, wherein the weight $h_n(i,j)$ of the ARB (i,j) is obtained by:
   calculating the total number of contour pixels found in the ARB (i,j).

7. The method according to claim 6, wherein the total number of contour pixels per ARB(i,j) is scaled by dividing the total mass of the binary image to obtain scale invariance.

8. The method according to claim 1, wherein the weight $h_n(i,j)$ of the ARB (i,j) is the accumulative distance, which is obtained by:
   calculating the Euclidean distance from the centre of mass to all the pixels of the contour shape;
   calculating the total accumulative distance for each ARB (i,j) by adding the Euclidean distances from the centre of mass to all the pixels of the contour pixels inside the ARB(i,j);
   scaling by dividing the total accumulative distance for each ARB(i,j) by means of the total mass of the binary image.

9. The method according to claim 1, wherein the weight $h_n(i,j)$ of the ARB (i,j) is obtained as the average distance by:
   calculating the total accumulative distance for each ARB (i,j) by adding the actual Euclidean distances from the centre of mass to all the pixels of the contour shape inside the ARB(i,j);
   calculating the average distance by dividing the total distance with the number of contour pixels present in each ARB(i,j);
   scaling by dividing the average distance per ARB(i,j) with the total mass of the binary image.

10. The method according to claim 1, wherein the step of calculating a histogram by calculating one or more shape descriptors involves:
    determining a 3D-histogram in a (i, j, n)-space comprising the shape descriptors of all N angle tilted instances, wherein i=1, 2, ... I, represents a circular band between two concentric circles and j=1, 2, 3, ..., J, represents the angular radial area section within a circular band and n is the order of angular tilted distance (w=n·δ) from a reference starting line(0°) of the ARB distribution.

11. The method according to claim 1, wherein the step of calculating a histogram using the calculated shape descriptors involves:
    calculating the weights of h(i,j) of the shape descriptor of a 2D-histogram in a (i, j)-plane, wherein the weights $h_n(i,j)$:s of overlapping bins ARB (i, j) in the same position (i, j) of different instances n, are added together to one single weight h(i, j) by using the equation:

$$\ldots$$

wherein i=1, 2, ... I, represents a circular band between two concentric circles and j=1, 2, 3, ..., J, represents the angular radial area section within a circular band and n is the order of angular tilted distance (θ=n·δ) from a reference starting line(0°) of the ARB distribution.

12. The method according to claim 1, wherein the step of determining the contour pixels of the captured image of a gesture is achieved by using the Suzuki algorithm.

13. The method according to claim 1, wherein the step of comparing the calculated histogram of the captured gesture image to the histograms of the database is performed by calculating the Euclidian distance between two the corresponding shape descriptors of each shape.

14. A device for recognizing a gesture in real-time, the device having access to a database of histograms, each histogram is a shape descriptor of a gesture image, each shape descriptor and histogram containing weights of the contour pixels, the weights being calculated by means of the contour pixels within Angular Radial Bins, ARBs, the device being connectable to a sensor adapted to capture an image of a gesture, and the device comprising a processing unit configured to:
determine a contour pixels image from the captured image of a query gesture;
calculate an ARB distribution adapted to the contour pixels image of the gesture;
determine a histogram by calculating a shape descriptor for each of an angle tilted instance (n) of the ARB distribution belonging to a sequence of angle tilted instances (n=0, 1, 2, . . . , N−1) of the ARB distribution, wherein the weight $h_n(i,j)$ of each ARB(i,j) is based on the contour pixels within the ARB(i,j);
compare the determined histogram of the captured gesture image to the histograms of the database; and
determine a gesture by selecting the histogram of the database best matching the calculated histogram.

15. The device according to claim 14, the ARB distribution comprises ARBs (i,j) corresponding to angular radial area sections defined within an outer circle and a number of intermediate concentric circles being concentric around a centre of mass of the shape contour and a number of radii starting in the centre of mass and perpendicularly crossing the intermediate concentric circles to the outer circle which radius being equivalent to the largest radial distance from the centre of mass to a contour pixel of the contour pixels, wherein each ARB (i, j) has a position (i, j) wherein i=1, 2, . . . I, represents a circular band between two concentric circles and j=1, 2, 3, . . . , J, represents the angular radial area section within a circular band and n is the order of angular tilted distance (θ=n·δ) from a reference starting line(0°) of the ARB distribution.

16. The device according to claim 15, wherein the processing unit is configured to determine the radius ρ the outer circle by calculating the largest radial Euclidian distance from the centre of mass to a contour pixel of the contour pixels, and the radial width of the circular bands being equidistant.

17. The method according to claim 15, wherein the angular width w of an angular radial area section is $$w = \frac{360}{J},$$

wherein J=the total number of angular radial area sections within a circular band.

18. The device according to claim 14, wherein the weight h.sub.n(i,j) of the ARB (i,j) is obtained by calculating the total number of contour pixels found in the ARB (i,j).

19. The device according to claim 18, wherein the total number of contour pixels per ARB(i,j) is scaled by dividing the total mass of the binary image to obtain scale invariance.

20. The device according to claim 14, wherein the processing unit is configured to calculate the weight $h_n(i,j)$ of the ARB (i,j) is the accumulative distance by:
calculating the Euclidean distance from the centre of mass to all the pixels of the contour shape;
calculating the total accumulative distance for each ARB (i,j) by adding the Euclidean distances from the centre of mass to all the pixels of the contour pixels inside the ARB(i,j);
scaling by dividing the total accumulative distance for each ARB(i,j) by means of the total mass of the binary image.

21. The device according to claim 14, wherein the processing unit is configured to calculate the weight $h_n(i,j)$ of the ARB (i,j) as the average distance by:
calculating the total accumulative distance for each ARB (i,j) by adding the Euclidean distances from the centre of mass to all the pixels of the contour shape inside the ARB(i,j);
calculating the average distance by dividing the total distance with the number of contour pixels present in each ARB(i,j);
scaling by dividing the average distance per ARB(i,j) with the total mass of the binary image.

22. The device according to any claim 14, wherein the processing unit is configured to use the $0^{th}$ and $1^{th}$ raw moments of the captured image to determine the centre of mass and the mass of the image.

23. The device according to claim 14, wherein the processing unit is configured to calculate a histogram using the calculated shape descriptors by:
determining a 3D-histogram in a (i, j, n)-space comprising the shape descriptors of all N angle tilted instances, wherein i=1, 2, . . . I, represents a circular band between two concentric circles and j=1, 2, 3, . . . , J, represents the angular radial area section within a circular band and n is the order of angular tilted distance (w=n·δ) from a reference starting line(0°) of the ARB distribution.

24. The device according to claim 14, wherein the processing unit is configured to calculating a histogram using the calculated shape descriptors by:
calculating the weights of h(i,j) of the shape descriptor of a 2D-histogram in a (i,j)-plane, wherein the weights $h_n(i,j)$:s of overlapping bins ARB (i,j) in the same position (i,j) of different instances n, are added together to one single weight h(i,j) by using the equation:

$$\ldots$$

wherein i=1, 2, . . . I, represents a circular band between two concentric circles and j=1, 2, 3, . . . , J, represents the angular radial area section within a circular band and n is the order of angular tilted distance (θ=n·δ) from a reference starting line(0°) of the ARB distribution.

25. The device according to claim 14, wherein the processing unit is configured to determine the contour pixels of the captured image of a gesture by using the Suzuki algorithm.

26. The device according to claim 14, wherein the processing unit is configured to compare the calculated histogram of the captured gesture image to the histograms of the database by calculating the Euclidian distance between two the corresponding shape descriptors of each shape.

* * * * *